US007995052B2

(12) United States Patent
Yamazaki

(10) Patent No.: US 7,995,052 B2
(45) Date of Patent: Aug. 9, 2011

(54) ELECTRO-OPTICAL DEVICE, DRIVING CIRCUIT AND ELECTRONIC APPARATUS

(75) Inventor: Katsunori Yamazaki, Matsumoto (JP)

(73) Assignee: Sony Corporation, Tokyo (JP)

( * ) Notice: Subject to any disclaimer, the term of this patent is extended or adjusted under 35 U.S.C. 154(b) by 1036 days.

(21) Appl. No.: 11/882,904

(22) Filed: Aug. 7, 2007

(65) Prior Publication Data

US 2008/0106541 A1 May 8, 2008

(30) Foreign Application Priority Data

Nov. 6, 2006 (JP) ................................ 2006-299943

(51) Int. Cl.
*G06F 3/038* (2006.01)
*G09G 5/00* (2006.01)
*G02F 1/133* (2006.01)

(52) U.S. Cl. ........ 345/212; 345/211; 345/213; 345/214; 349/33

(58) Field of Classification Search .................... 345/84, 345/94–96, 208–214; 349/33, 37
See application file for complete search history.

(56) References Cited

U.S. PATENT DOCUMENTS 4,804,951 A * 2/1989 Yamashita et al. .............. 345/92
6,266,038 B1 * 7/2001 Yoshida et al. ................. 345/92

FOREIGN PATENT DOCUMENTS

JP A 2005-300948 10/2005

* cited by examiner

*Primary Examiner* — Sumati Lefkowitz
*Assistant Examiner* — Jonathan Horner
(74) *Attorney, Agent, or Firm* — K&L Gates LLP

(57) ABSTRACT

A driving circuit includes a plurality of scanning lines, a plurality of data lines, a plurality of common electrodes, pixels, a scanning line driving circuit, a common electrode driving circuit, and a data line driving circuit. When a predetermined number of scanning lines away from the one of the odd (or even)-numbered scanning lines is selected, the common electrode driving circuit applies one (the other) of a low level voltage and a high level voltage to the common electrode, and, after the selection of the one of the odd (or even)-numbered scanning lines is completed or after the selection of the scanning line located a predetermined number of scanning lines away from the one of the odd (or even)-numbered scanning lines is completed, the common electrode driving circuit maintains the common electrode at the one of the low level voltage and the high level voltage.

10 Claims, 27 Drawing Sheets

ELECTRO-OPTICAL DEVICE, DRIVING CIRCUIT AND ELECTRONIC APPARATUS

BACKGROUND

1. Technical Field

The present invention relates to a technology for suppressing display chrominance non-uniformity in an electro-optical device such as a liquid crystal display.

2. Related Art

In Japanese Unexamined Patent Application Publication No. 2005-300948, it is disclosed that an electro-optical device, such as a liquid crystal display, as an example of the related art, includes pixel capacitors (liquid crystal capacitors) arranged at positions corresponding to intersections of scanning lines and data lines, wherein, in order to suppress the voltage amplitudes of the data lines when these pixel capacitors are driven with alternating current, a common electrode is separately formed for each scanning line (each row) and, when a scanning line is selected, the common electrode corresponding to the selected scanning line is connected through a transistor to a power feed line that is applied with a voltage corresponding to a writing polarity.

However, in this example of the related art, the transistor that connects the common electrode to the power feed line is turned on during a selection period when the corresponding scanning line is selected, but, because the transistor is turned off during a non-selection period when the corresponding scanning line is not selected, the common electrode enters a voltage indeterminate state (a high impedance state) in which the common electrode is electrically not connected to any components. For this reason, the voltage of the common electrode fluctuates because variations in voltages applied to the data lines are transmitted to the common electrode through parasitic capacitances and/or the common electrode receives an influence of noise. Thus, there has been a problem that display chrominance non-uniformity occurs.

SUMMARY

An advantage of some aspects of the invention is that it provides an electro-optical device, a driving circuit and an electronic apparatus that are capable of suppressing the occurrence of display chrominance non-uniformity with a configuration in which common electrodes are separately driven.

A first aspect of the invention provides a driving circuit for an electro-optical device. The driving circuit includes a plurality of scanning lines, a plurality of data lines, a plurality of common electrodes, pixels, a scanning line driving circuit, a common electrode driving circuit, and a data line driving circuit. The plurality of common electrodes are provided in correspondence with the plurality of scanning lines. The pixels are arranged at positions corresponding to intersections of the plurality of scanning lines and the plurality of data lines. Each of the pixels includes a pixel switching element and a pixel capacitor. One end of each pixel switching element is connected to a corresponding one of the data lines, and the pixel switching element enters an electrical conductive state when a corresponding one of the scanning lines is selected. One end of each pixel capacitor is connected to an end of the pixel switching element, which is not connected to the date line, and the other end of the pixel capacitor, which is not connected to the pixel switching element, is connected to the common electrode. Each pixel emits light with a gray-scale level corresponding to a voltage held by the pixel capacitor. The scanning line driving circuit sequentially selects the scanning lines in a predetermined order. The common electrode driving circuit separately drives the plurality of common electrodes. The data line driving circuit supplies the pixels corresponding to the selected scanning line with data signals of voltages corresponding to gray-scale levels of the pixels through the data lines. When one of odd-numbered scanning lines or a scanning line located a predetermined number of scanning lines away from the one of the odd-numbered scanning lines is selected, the common electrode driving circuit applies one of a low level voltage and a high level voltage to the common electrode corresponding to the one of the odd-numbered scanning lines, and, after the selection of the one of the odd-numbered scanning lines is completed or after the selection of the scanning line located a predetermined number of scanning lines away from the one of the odd-numbered scanning lines is completed, the common electrode driving circuit maintains the common electrode corresponding to the one of the odd-numbered scanning line at the one of the low level voltage and the high level voltage. When one of even-numbered scanning lines or a scanning line located a predetermined number of scanning lines away from the one of the even-numbered scanning lines is selected, the common electrode driving circuit applies the other of the low level voltage and the high level voltage to the common electrode corresponding to the one of the even-numbered scanning lines, and, after the selection of the one of the even-numbered scanning lines is completed or after the selection of the scanning line located a predetermined number of scanning lines away from the one of the even-numbered scanning lines is completed, the common electrode driving circuit maintains the common electrode corresponding to the one of the even-numbered scanning lines at the other of the low level voltage and the high level voltage. According to the first aspect of the invention, because the common electrode driving circuit has each of the common electrodes enter a voltage determinate state, irrespective of selection or non-selection of the scanning lines, fluctuation in voltages of the common electrodes due to a noise, or the like, is prevented. Note that, in the aspect of the invention, the odd number and the even number are only relative concepts for specifying rows or columns that are arranged alternately.

In the first aspect of the invention, the common electrode driving circuit may include first to fourth transistors provided in correspondence with each of the common electrodes, wherein a gate electrode of each first transistor of the first transistors is connected to a corresponding one of the scanning lines or a scanning line located a predetermined number of scanning lines away from the corresponding one of the scanning lines and a source electrode of each first transistor is connected to a first power feed line that is supplied with a voltage with which the third transistor enters one of an on state and an off state, wherein a gate electrode of each second transistor of the second transistors is connected to a corresponding one of the scanning lines or a scanning line located a predetermined number of scanning lines away from the corresponding one of the scanning lines and a source electrode of each second transistor is connected to a second power feed line that is supplied with a voltage with which the fourth transistor enters the other of an on state and an off state, wherein a gate electrode of each third transistor of the third transistors is connected to a drain electrode of a corresponding one of the first transistors and a source electrode of each third transistor is connected to a third power feed line that is supplied with one of a low level voltage and a high level voltage, wherein a gate electrode of each fourth transistor of the fourth transistors is connected to a drain electrode of a corresponding one of the second transistors and a source electrode of each fourth transistor is connected to a fourth power feed line that is supplied with the other of a low level voltage and a high level voltage, and wherein a drain electrode of each third transistor and a drain electrode of each fourth transistor are commonly connected to the corresponding common electrode. Alternatively, the common electrode driving circuit may include first and third transistors provided in correspondence with each of the odd-numbered common electrodes, and the common electrode driving circuit includes second and fourth transistors provided in correspondence with each of the even-numbered common electrodes, wherein a gate electrode of each first transistor of the first transistors is connected to a corresponding one of the scanning lines or a scanning line located a predetermined number of scanning lines away from the corresponding one of the scanning lines and a source electrode of each first transistor is connected to a first power feed line that is supplied with a voltage with which the third transistor enters one of an on state and an off state, wherein a gate electrode of each second transistor of the second transistors is connected to a corresponding one of the scanning lines or a scanning line located a predetermined number of scanning lines away from the corresponding one of the scanning lines and a source electrode of each second transistor is connected to a second power feed line that is supplied with a voltage with which the fourth transistor enters the other of an on state and an off state, wherein a gate electrode of each third transistor of the third transistors is connected to a drain electrode of the corresponding first transistor and a source electrode of each third transistor is connected to a third power feed line that is supplied with one of a low level voltage and a high level voltage, wherein a gate electrode of each fourth transistor of the fourth transistors is connected to a drain electrode of the corresponding second transistor and a source electrode of each fourth transistor is connected to a fourth power feed line that is supplied with the other of a low level voltage and a high level voltage, and wherein a drain electrode of each third transistor is connected to a corresponding one of the odd-numbered common electrodes and a drain electrode of each fourth transistor is connected to a corresponding one of the even-numbered common electrodes.

Here, the first power feed line may be supplied with a voltage with which the third transistor enters an on state or an off state, the voltage being inverted every time a scanning line is selected, wherein the third power feed line may be supplied with one of the low level voltage and the high level voltage at least over a period of one frame, and wherein the fourth power feed line may be supplied with the high level voltage when the third power feed line is supplied with the low level voltage, and the fourth power feed line may be supplied with the low level voltage when the third power feed line is supplied with the high level voltage. Alternatively, the first power feed line may be supplied with a voltage with which the third transistor enters an on state or an off state at least over a period of one frame, wherein the third power feed line may be supplied with the low level voltage or the high level voltage which is inverted every time a scanning line is selected, and wherein the fourth power feed line may be supplied with the high level voltage when the third power feed line is supplied with the low level voltage, and the fourth power feed line may be supplied with the low level voltage when the third power feed line is supplied with the high level voltage. On the other hand, in order to employ a so-called dot inversion drive method, each of the common electrodes may include first and second common electrodes provided in correspondence with a corresponding one of the scanning lines, wherein an end, not connected to the pixel switching element, of each of the pixel capacitors in the odd-numbered columns is connected to the corresponding first common electrode, while an end, not connected to the pixel switching element, of the pixel capacitor in the even-numbered column is connected to the corresponding second common electrode, and wherein, when a corresponding one of the scanning lines or a scanning line located a predetermined number of scanning lines away from the corresponding one of the scanning lines is selected, the common electrode driving circuit applies one of a low level voltage and a high level voltage to the first common electrode corresponding to the corresponding one of the scanning lines, and the common electrode driving circuit applies the other of a low level voltage and a high level voltage to the second common electrode corresponding to the corresponding one of the scanning lines.

The common electrode driving circuit may further include, in addition to the first through fourth transistors, a fifth transistor provided in correspondence with each of the common electrodes, wherein a gate electrode of each fifth transistor of the fifth transistors is connected to a corresponding one of the scanning lines, a source electrode of each fifth transistor is connected to a fifth power feed line that is supplied with a voltage applied to a corresponding one of the common electrodes, and a drain electrode of each fifth transistor is connected to the corresponding common electrode. Furthermore, the common electrode driving circuit may further include a sixth transistor provided in correspondence with each of the common electrodes, wherein a gate electrode of each sixth transistor of the sixth transistors is connected to a corresponding one of the scanning lines, a source electrode of each sixth transistor is connected to a corresponding one of the common electrodes, and a drain electrode of each sixth transistor is connected to a detection line, and wherein the fifth power feed line is supplied with a signal that is controlled so that a voltage of the detection line becomes one of the low level voltage and the high level voltage. On the other hand, the common electrode driving circuit may further include, in addition to the first through fourth transistors, seventh and eighth transistors provided in correspondence with each of the common electrodes, wherein a gate electrode of each seventh transistor of the seventh transistors is connected to a corresponding one of the scanning lines, a source electrode of each seventh transistor is supplied with an off voltage with which the third and fourth transistors enter off states, and a drain electrode of each seventh transistor is connected to the gate electrode of the corresponding third transistor, wherein a gate electrode of each eighth transistor of the eighth transistors is connected to a corresponding one of the scanning lines, a source electrode of each eighth transistor is supplied with the off voltage, and a drain electrode of each eighth transistor is connected to the gate electrode of the corresponding fourth transistor. Here, the drain electrodes of the seventh and eighth transistors may be connected to the corresponding common electrode.

A second aspect of the invention may provide an electro-optical device, as well as a driving circuit for an electro-optical device. In such an electro-optical device, the other end of each of the pixel capacitors in one of the odd-numbered columns and the even-numbered columns may be connected to a corresponding one of the common electrodes, and the other end of each of the pixel capacitors in the other of the odd-numbered columns and the even-numbered columns may be connected to a common electrode adjacent to the corresponding one of the common electrode. Alternatively, the other end of each of the pixel capacitors in one of the odd-numbered rows and columns and even-numbered rows and columns, and the odd-numbered rows and even-numbered columns and the even-numbered rows and odd-numbered columns, may be connected to a corresponding one of the common electrodes, and the other end of each of the pixel capacitors in the other of the odd-numbered rows and columns and even-numbered rows and columns, and the odd-numbered rows and even-numbered columns and the even-numbered rows and odd-numbered columns, may be connected to a common electrode adjacent to the corresponding one of the common electrodes. In addition, a third aspect of the invention may provide an electronic apparatus having an electro-optical device, as well as the electro-optical device described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments according to the invention will be described with reference to the accompanying drawings.

First Embodiment

Figure 1:
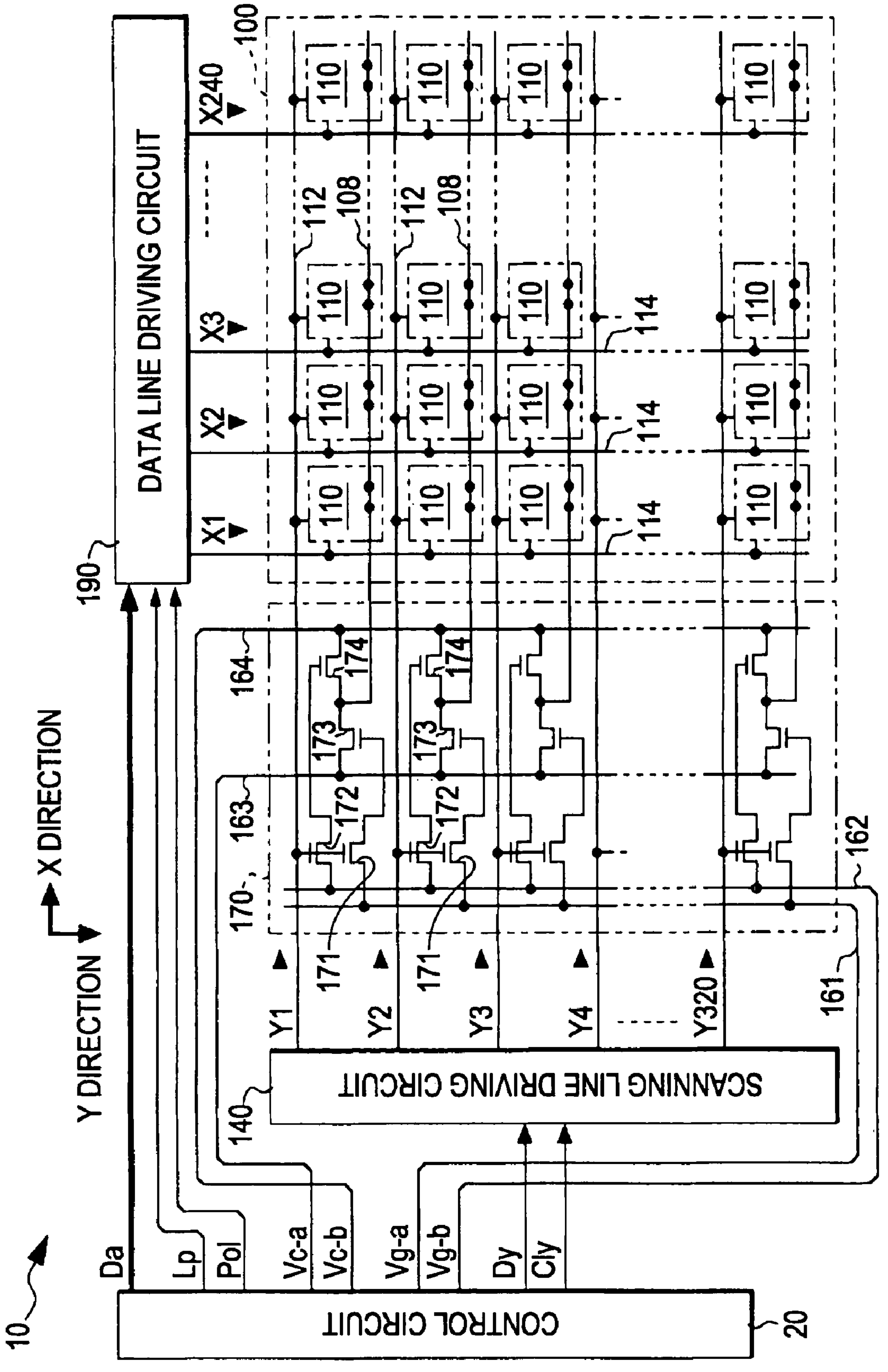
FIG. 1 is a view showing a configuration of an electro-optical device according to a first embodiment of the invention.

First, a first embodiment according to the invention will be described. FIG. 1 is a block diagram showing a configuration of an electro-optical device according to the first embodiment of the invention. As shown in the drawing, the electro-optical device 10 has a panel configuration of a built-in peripheral circuit type. The electro-optical device 10 includes a display area 100, a scanning line driving circuit 140, a common electrode driving circuit 170 and a data line driving circuit 190. These circuits 140, 170, 190 are arranged around the display area 100. In addition, a control circuit 20 is connected to the built-in peripheral circuit type panel by means of, for example, an FPC (flexible printed circuit) substrate.

The display area 100 is an area in which pixels 110 are arranged. In this embodiment, first through 320th scanning lines 112 are formed so as to extend in a horizontal direction (an X direction), while 240 data lines 114 are formed so as to extend in a vertical direction (a Y direction). Then, the pixels 110 are arranged at positions corresponding to intersections of the first to 320th scanning lines 112 and the first to 240th data lines 114. Thus, the pixels 110 are arranged in the display area 100 in a matrix of 320 rows by 240 columns, but this aspect of the invention is not intended to be limited to this pixel arrangement. In addition, common electrodes 108 are formed in correspondence with the first to 320th scanning lines 112 so as to extend in the X direction. This means that the common electrodes 108 are provided in correspondence with the first to 320th scanning lines 112.

Figure 2:
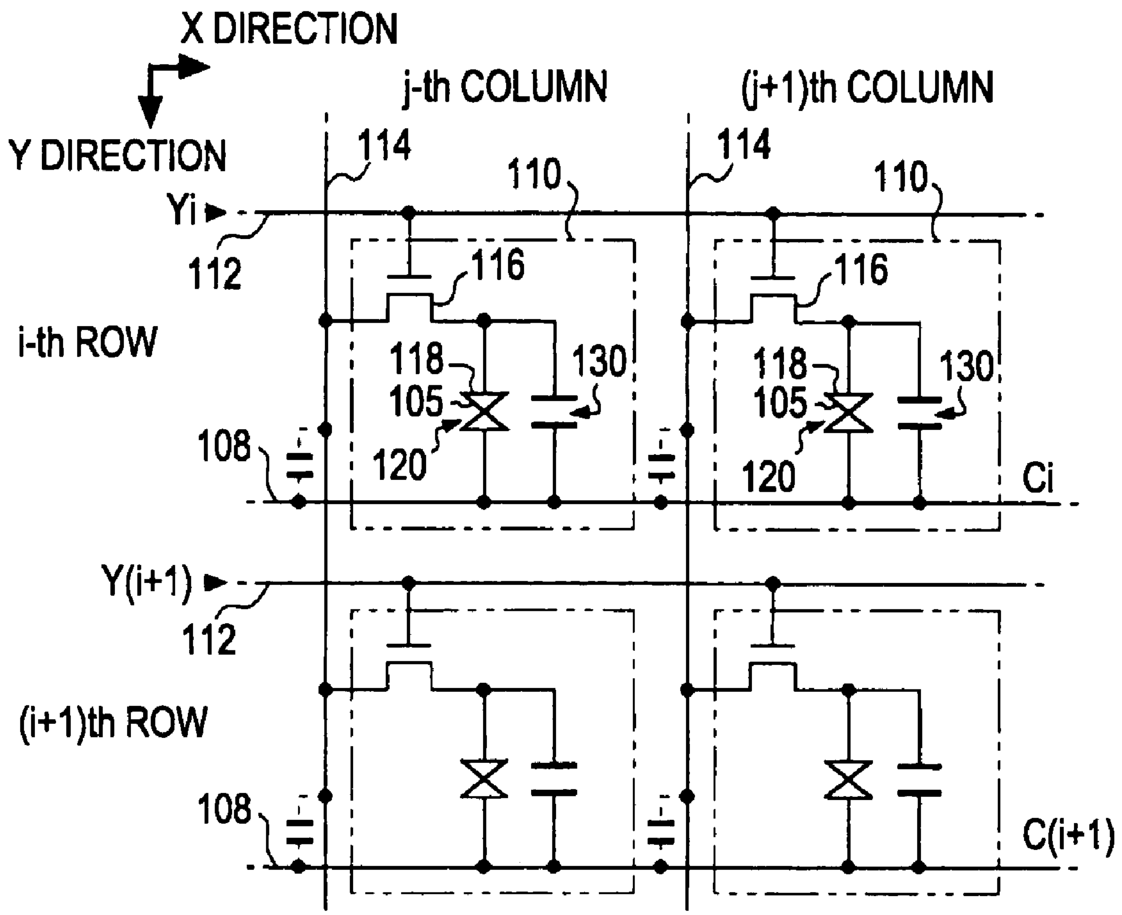
FIG. 2 is a view showing a configuration of pixels in the electro-optical device.

Here, a configuration of the pixel 110 will be described in detail. FIG. 2 is a view showing a configuration of each pixel 110, illustrating a configuration of four pixels arranged in a two by two matrix, which correspond to intersections of the i-th row, the (i+1)th row next to and below the i-th row, the j-th column, and the (j+1)th column next to and to the right of the j-th column. Note that symbols “i”, “(i+1)” generally indicate rows in which the pixels 110 are arranged and are integers ranging from 1 to 320, and symbols “j”, “(j+1)” generally indicate columns in which the pixels 110 are arranged and are integers ranging from 1 to 240.

As shown in FIG. 2, each of the pixels 110 includes an n-channel thin-film transistor (hereinafter, simply referred to as “TFT”) 116 which serves as a pixel switching element, a pixel capacitor (a liquid crystal capacitor) 120 and a storage capacitor 130. Because the pixels 110 have the same configuration with respect to each other, the pixel 110 located at the i-th row and the j-th column will be described as an example. In the pixel 110 at the i-th row and the j-th column, the gate electrode of the TFT 116 is connected to the i-th scanning line 112, the source electrode of the TFT 116 is connected to the j-th data line 114, and the drain electrode of the TFT 116 is connected to one end of the pixel capacitor 120 and one end of the storage capacitor 130. In addition, the other end of the pixel capacitor 120 and the other end of the storage capacitor 130 are connected to the common electrode 108. Note that, in FIG. 2, Yi, Y(i+1) respectively indicate scanning signals supplied to the i-th and (i+1)th scanning lines 112 and Ci and C(i+1) respectively indicate voltages applied to the i-th and (i+1)th common electrodes 108. The optical characteristics, or the like, of these pixel capacitors 120 will be described later.

Referring back to FIG. 1, the control circuit 20 outputs various control signals to execute control, or the like, of the portions in the electro-optical device 10. Note that the control signals will be described later where appropriate.

Figure 4:
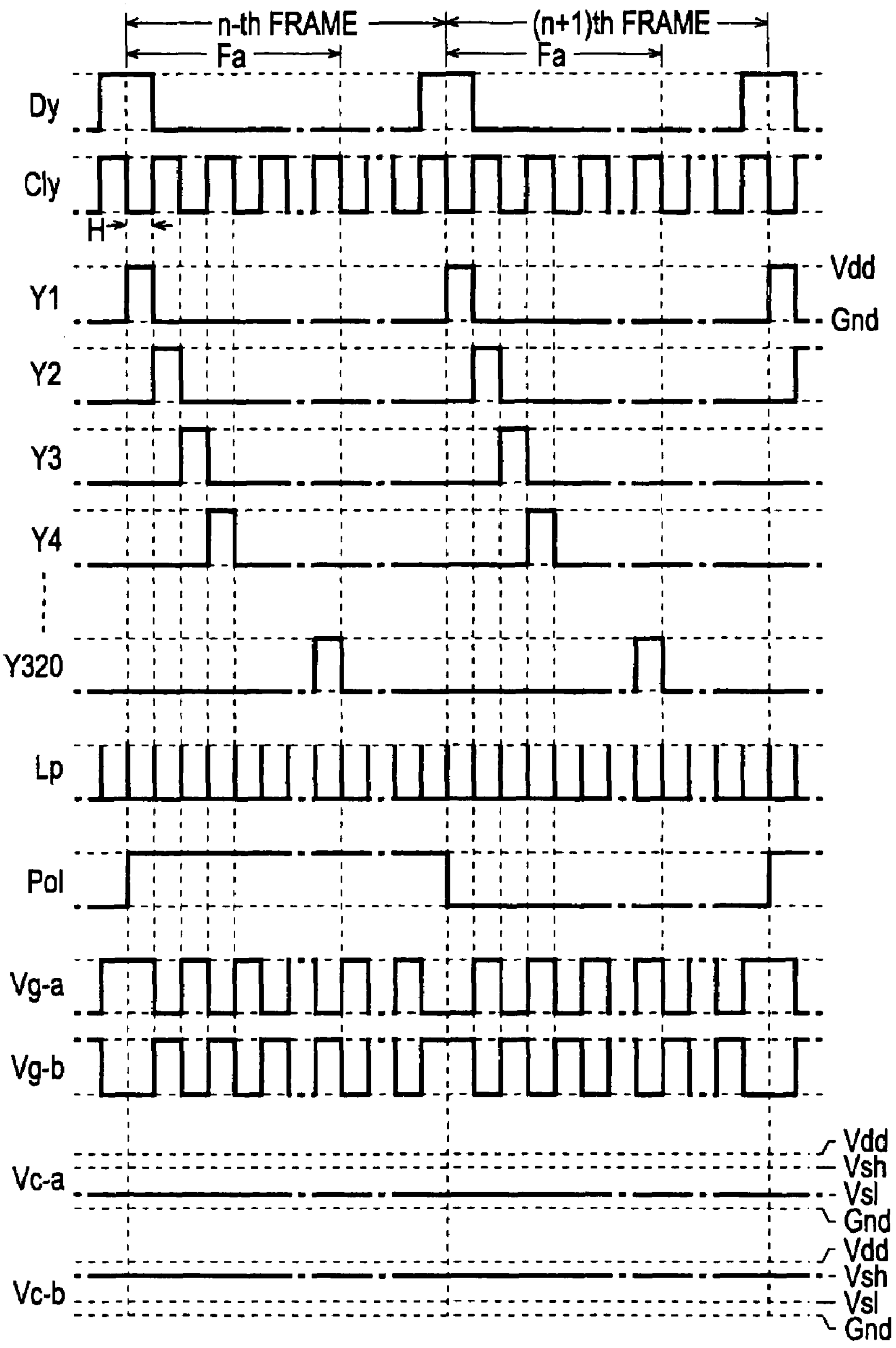
FIG. 4 is a view illustrating the operation of the electro-optical device.

The peripheral circuits, such as the scanning line driving circuit 140, the common electrode driving circuit 170 and the data line driving circuit 190, are provided around the display area 100, as described above. Of these circuits, the scanning line driving circuit 140 supplies scanning signals Y1, Y2, Y3, . . . , Y320, and Y321 to the first, second, third, . . . , 320th, and 321st scanning lines 112 over a period of one frame in accordance with the control executed by the control circuit 20. Specifically, the scanning line driving circuit 140 sequentially selects the scanning lines 112 in the order of, from the upper side in FIG. 1, the first, second, third, . . . , 320th, and 321st scanning lines, and sets a scanning signal for the selected scanning line to an H level corresponding to a voltage Vdd and sets scanning signals for the other scanning lines to an L level corresponding to a non-selection voltage (a ground potential Gnd). Note that the scanning line driving circuit 140, as shown in FIG. 4, sequentially shifts a start pulse Dy supplied from the control circuit 20 in accordance with a clock signal Cly and has the scanning signals Y1, Y2, Y3, Y4, . . . , Y320, and Y321 attain H levels in the stated order. In addition, in the present embodiment, a period of one frame, as shown in FIG. 4, not only includes an effective scanning period Fa from the time when the scanning signal Y1 attains an H level to the time when the scanning signal Y320 attains an L level but also includes the other fly-back periods. However, the fly-back periods need not be provided. Note that a period during which one scanning line 112 is selected is termed a horizontal scanning period (H).

The common electrode driving circuit 170 is formed of sets of n-channel TFTs 171 to 174 provided in correspondence with each of the first to 320th common electrodes 108. Because the TFTs 171 to 174 are the same in each row, the TFTs 171 to 174 located in the i-th row will be described as an example. In the i-th row TFT 171 (a first transistor), the gate electrode is connected to the i-th scanning line 112, the source electrode is connected to a first power feed line 161, and the drain electrode is connected to the gate electrode of the TFT 173. In the TFT 172 (a second transistor) in the same i-th row, the gate electrode is connected to the i-th scanning line 112, the source electrode is connected to a second power feed line 162, and the drain electrode is connected to the gate electrode of the TFT 174. On the other hand, the source electrode of the i-th row TFT 173 (a third transistor) is connected to a third power feed line 163, and the source electrode of the TFT 174 (a fourth transistor) in the same i-th row is connected to a fourth power feed line 164. The drain electrodes of the TFTs 173, 174 are commonly connected to the i-th row common electrode 108.

The data line driving circuit 190 supplies the data lines 114 with data signals of voltages corresponding to a writing polarity specified by a polarity specifying signal Pol and corresponding to gray-scale levels of the pixels 110 located on the scanning line 112 selected by the scanning line driving circuit 140. Here, the data line driving circuit 190 includes memory areas (not shown) corresponding to a pixel matrix array of 320 horizontal rows by 240 vertical columns, and each of the memory areas stores display data Da that specifies a gray scale value (brightness) of the corresponding pixel 110. Here, the data line driving circuit 190, when one scanning line 112 is selected, reads out the display data Da of the pixels 110 located on the selected scanning line 112 from the memory areas and supplies the data lines 114 with data signals of voltages corresponding to a specified polarity and converted from voltages corresponding to gray-scale levels specified by the read display data. The data line driving circuit 190 executes operation to supply the data signals for each of the first to 240th data lines 114 located on the selected scanning line 112. Note that the display data Da stored in each memory area is updated by the modified display data Da supplied with an address by the control circuit 20 when the display content needs to be changed.

In addition, the control circuit 20 supplies the data line driving circuit 190 with a latch pulse Lp at a timing when the logical level of a clock signal is changed. As described above, the scanning line driving circuit 140 sequentially shifts the start pulse Dy in accordance with the clock signal Cly and outputs the scanning signals Y1, Y2, Y3, Y4, . . . , and Y320, so that the start timing of a period during which a scanning line is selected is a timing when the logic level of the clock signal Cly is changed. Thus, the data line driving circuit 190 is able to determine which scanning line is selected by continuing to count the latch pulses Lp from the beginning of a period of one frame and to acquire a start timing of the selection owing to a supply timing of the latch pulse Lp.

In the present embodiment, the polarity specifying signal Pol is a signal that specifies positive polarity writing for the odd-numbered (1, 3, 5, . . . , 319) scanning lines and specifies negative polarity writing for the even-numbered (2, 4, 6, . . . , 320) scanning lines when the polarity specifying signal Pol is at an H level, while, on the other hand, the polarity specifying signal Pol is a signal that specifies negative polarity writing for the odd-numbered scanning lines and specifies positive polarity writing for the even-numbered scanning lines when the polarity specifying signal Pol is at an L level. As shown in FIG. 4, an H level is maintained over a period of one frame (which is indicated as "n-th frame"). For this reason, the present embodiment employs a row inversion drive (which is also called line inversion drive, scanning line inversion drive) method in which a writing polarity for the pixels is inverted every scanning line. Note that the polarity specifying signal Pol is logically inverted to be at an L level during the next frame (indicated as "(n+1)th frame"). The reason why a writing polarity is so inverted is to prevent degradation of liquid crystal due to a direct current component applied thereto. Incidentally, as regards a writing polarity in the present embodiment, it is defined as a positive polarity in a case where the voltage of the pixel electrode 118 is higher than the voltage of the common electrode 108 and as a negative polarity in a case where the voltage of the pixel electrode 118 is lower than the voltage of the common electrode 108 when the pixel capacitor 120 holds a voltage corresponding to the gray-scale level. As regards a voltage, unless otherwise specified, the ground potential Gnd corresponds to a logical L level and is used as a reference of zero voltage.

As shown in FIG. 4 in the present embodiment, in a frame when the polarity specifying signal Pol is at an H level, a signal Vg-a, which is supplied to the first power feed line 161, is at an H level during a period when an odd-numbered scanning line 112 is selected and is at an L level during a period when an even-numbered scanning line 112 is selected, while, in a frame when the polarity specifying signal Pol is at an L level, the signal Vg-a is at an L level during a period when an odd-numbered scanning line 112 is selected and is at an H level during a period when an even-numbered scanning line 112 is selected. Note that a signal Vg-b, which is supplied to the second power feed line 162, is logically inverted as compared to the signal Vg-a. For this reason, the signals Vg-a, Vg-b are inverted with respect to each other in each frame. Here, the logical H level corresponds to the above described voltage Vdd, which is an on voltage, causing the source electrodes and drain electrodes of the TFTs 173, 174 to enter electrical conductive states (on states) as the voltage Vdd is applied to the gate electrodes of the TFTs 173, 174. In contrast, the logical L level corresponds to the ground potential Gnd, which is an off voltage, causing the source electrodes and drain electrodes of the TFTs 173, 174 to enter electrical non-conductive states (off states) when the ground potential is applied to the gate electrodes of the TFTs 173, 174.

In addition, a common signal Vc-a, which is supplied to a third power feed line 163, is constant at a voltage Vsl, as shown in FIG. 4, and a common signal Vc-b, which is supplied to a fourth power feed line 164, is constant at a voltage Vsh. Here, the voltages Vsl, Vsh have the relationship (Gnd≦) Vsl<Vsh (≦Vdd). The voltage Vsl is lower than the voltage Vsh (that is, the voltage Vsh is higher than the voltage Vsl).

Figure 3:
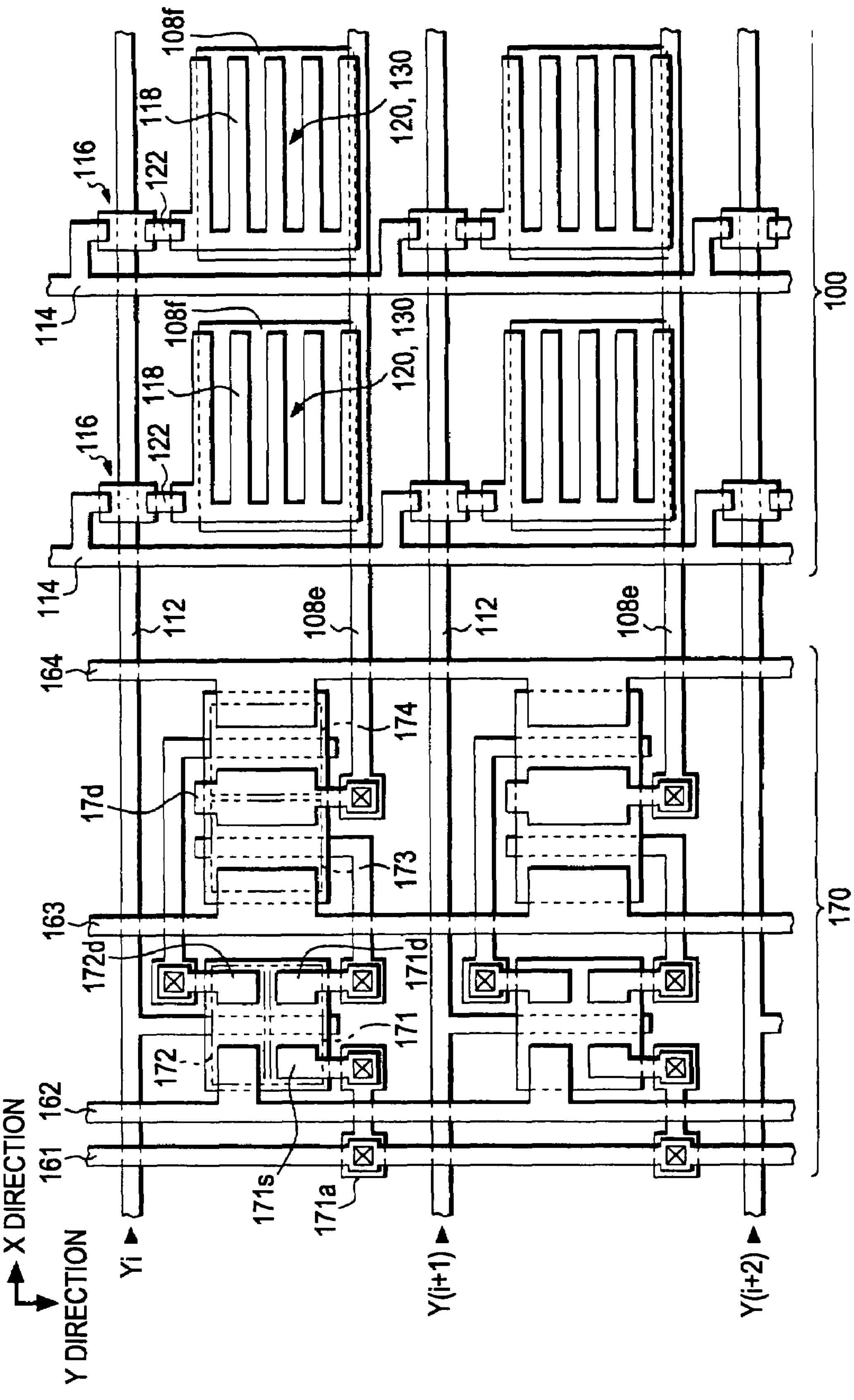
FIG. 3 is a plan view showing a relevant configuration in an element substrate of the electro-optical device.

A panel of the electro-optical device is configured so that a pair of an element substrate and an opposing substrate are adhered to each other with a certain gap therebetween and a liquid crystal is placed in the gap and sealed therein. In addition, the above described scanning lines 112, the data lines 114, the common electrodes 108, the pixel electrodes 118 and the TFTs 116, 171 to 174 are formed on the element substrate, and an electrode forming surface and the opposing substrate are adhered together so as to be opposite each other. FIG. 3 is a plan view showing the portions near the boundary between the display area 100 and the common electrode driving circuit 170, of these components.

As seen from FIG. 3, the display area 100 employs an FFS (fringe field switching) mode, which is a modification of an IPS mode in which a direction in which an electric field is applied to a liquid crystal is set to a direction in which the substrate surface extends. In the present embodiment, the TFTs 116, 171 to 174 are of the amorphous silicon type and are of the bottom gate type in which the gate electrode is formed below (the rear side in the drawing) the semiconductor layer. Specifically, a rectangular electrode **108*f* is formed by patterning a (first) ITO (indium tin oxide) layer, which is a first conductive layer, and the scanning lines 112 and gate wiring lines such as common lines 108*e* are formed by patterning a gate electrode layer, which is a second conductive layer. A gate insulation film (not shown) is formed on the gate wiring lines. Further, the semiconductor layers of the TFTs are formed in an island shape. On these semiconductor layers, a (second) ITO layer, which is a third conductive layer, is patterned via a protection insulation layer to form comb-shaped pixel electrodes 118, and further, a metal layer, which is a fourth conductive layer, is patterned to form the data lines 114, the first power feed line 161, the second power feed line 162, the third power feed line 163, the fourth power feed line 164** and various connection electrodes, together with the source electrodes and drain electrodes of the TFTs.

Here, each of the common electrodes 108 shown in FIG. 1 and FIG. 2 is actually divided into a common line **108*e* that extends parallel to the scanning line 112 and rectangular electrodes 108*f* on which the pixel electrodes 118 are respectively laminated via the protection insulation layer, as shown in FIG. 3. Here, the common line 108*e* and each of the electrodes 108*f*, located in the same row, have portions that overlap each other, so that they are electrically conductive with each other. For this reason, because the common line 108*e* and the electrodes 108*f*, located in the same row, may be electrically integrated as one component and need not be differentiated, they are not separately treated and simply referred to as the common electrode 108** unless it is structurally described.

In the present embodiment, each of the storage capacitors 130 is a capacitive component that is formed of a laminated structure in which the electrode **108*f* and the pixel electrode 118 are laminated via the protection insulation layer. In addition, because the liquid crystal is placed in the gap between the element substrate and the opposing substrate and sealed therein, a capacitive component is formed of a structure in which the liquid crystal, which is a dielectric, is held between the pixel electrode 118 and the electrode 108*f*. The capacitive component formed by intervening the liquid crystal is defined as the pixel capacitor 120 in the present embodiment. In this configuration, an electric field corresponding to a holding voltage held by parallel capacitors consisting of the pixel capacitor 120 and the storage capacitor 130 is generated along the surface of the element substrate and in the Y direction perpendicular to a direction in which the comb-shaped portion of the pixel electrode 118 extends. This electric field changes the orientation of the liquid crystal. In this manner, the amount of light that is transmitted through a polarizer (not shown) becomes a value corresponding to the holding voltage. Note that the present embodiment employs an FFS mode; however, an IPS mode may also be employed. As far as an electrically equivalent circuit is like the circuit shown in FIG. 2**, other modes may also be employed.

Note that, because the holding voltage of the parallel capacitors is a differential voltage between the pixel electrode 118 and the common electrode 108 (electrode **108*f*), it is only necessary to have the TFT 116 enter an electrical conductive state (on state) by applying an H level voltage Vdd to the i-th scanning line 112 and supplying the pixel electrode 118 with the data signal X of a voltage, with which the differential voltage becomes a value corresponding to a gray-scale level of the pixel, through the j-th data line 114 and the i-th row and j-th column TFT 116** in order to have the i-th row and j-th column pixel attain a desired gray-scale level. Note that, for the purpose of easy description, the present embodiment employs a normally white mode display, in which the transmittance ratio of light becomes maximal to perform white display the closer the voltage effective value is to zero, while the amount of transmissive light is reduced the larger the voltage effective value is, and finally to perform black display when the transmittance ratio becomes minimal.

On the other hand, each of the scanning lines 112 is arranged in the display area 100 so as to extend in the X direction, as described above. Here, for example, the i-th scanning line 112 includes a portion that is branched in the Y (downward) direction in the common electrode driving circuit 170. This branched portion forms a common gate electrode of the TFTs 171, 172. The drain electrode **171*d* of the TFT 171 is formed by patterning the above fourth conductive layer, and a protection insulation layer, or the like, is interposed between the drain electrode 171***d* of the TFT 171 and the gate electrode of the TFT 173 that is formed by patterning the second conductive layer, so that the drain electrode 171*d* of the TFT 173 and the gate electrode of the TFT 173 are connected through a contact hole (indicated by the symbol x in the drawing) that is formed through the insulation layer. For the same reason, the drain electrode 172*d* of the TFT 172 is connected to the gate electrode of the TFT 174 through a contact hole, and the common drain electrode 17*d* of the TFTs 173, 174 is connected to the common electrode 108 through a contact hole. On the other hand, a connection wiring line 171*a* is formed by patterning the second conductive layer and connects the source electrode 171*s* of the TFT 171 to the first power feed line 161 by passing below the second power feed line 162. A connection electrode 122 is formed by patterning the fourth conductive layer and connects the pixel electrode 118 to the drain electrode of the TFT 116. Note that each of the common electrodes 108 intersects with the first to 240th data lines 114 via the gate insulation film, or the like, so that they are capacitively coupled through parasitic capacitances, as shown by the broken lines in FIG. 2.

FIG. 3 shows an example of the configuration. As regards the type of thin-film transistor used, other structures are applicable. For example, a top-gate-type thin-film transistor is applicable in terms of the arrangement of a gate electrode, and a polysilicon-type thin-film transistor is applicable in terms of the process used. Furthermore, it is applicable that an IC chip is mounted on the element substrate, instead of integrating the elements of the common electrode driving circuit 170 onto the substrate in the same process of forming the display area 100. When an IC chip is mounted on the element substrate, the scanning line driving circuit 140 and the common electrode driving circuit 170 may be formed as one semiconductor chip, together with the data line driving circuit 190, or may be formed as separate semiconductor chips independent of each other. On the other hand, the control circuit 20 may be integrated onto the element substrate. In addition, in the present embodiment, a transmissive-type liquid crystal display panel, a reflective-type liquid crystal display panel and a so-called transflective-type liquid crystal display panel, in which the transmissive-type liquid crystal display panel and the reflective-type liquid crystal display panel are combined, are applicable. Therefore, a reflective layer, or the like, is not particularly described.

The operation of the electro-optical device 10 according to the present embodiment will now be described. In the present embodiment as described above, the control circuit 20, as shown in FIG. 4, sets the polarity specifying signal Pol to an H level during a period of the n-th frame, sets the signal Vg-a to an H level (sets the signal Vg-b to an L level) when an odd-numbered scanning line is selected and sets the signal Vg-a to an L level (sets the signal Vg-b to an H level) when an even-numbered scanning line is selected. Note that, in this embodiment, the common signal Vc-a is constant at the voltage Vsl and the common signal Vc-b is constant at the voltage Vsh. In the n-th frame, the scanning line driving circuit 140 initially selects the first scanning line 112 and sets the scanning signal Y1 to an H level. As the latch pulse Lp is output at the timing when the scanning signal Y1 attains an H level, the data line driving circuit 190 reads out the display data Da of the first, second, third, . . . , 240th column pixels in the first row and supplies the corresponding first, second, third, . . . , 240th data lines 114 with data signals X1, X2, X3, . . . , X240 of voltages which are converted to levels higher than the reference voltage Vsl by amounts specified by the display data Da. In this manner, for example, a voltage that is set to a level higher than the voltage Vsl by an amount specified by the display data Da of the first row and j-th column pixel 110 is applied to the j-th data line 114 as a data signal Xj. As the scanning signal Y1 attains an H level, the TFTs 116 in the pixels of the first row and first column to the first row and 240th column turn on. Thus, the data signals X1, X2, X3, . . . , X240 are applied to the pixel electrodes 118 of these pixels.

On the other hand, during a period when the scanning signal Y1 is at an H level, the first row TFTs 171, 172 in the common electrode driving circuit 170 are turned on. Here, during a period when the scanning signal Y1 is at an H level, the signal Vg-a supplied to the first power feed line 161 is at an H level, and the signal Vg-b supplied to the second power feed line 162 is at an L level, so that the first row TFT 173 turns on and the first row TFT 174 turns off by the turning on of the first row TFTs 171, 172. For this reason, the first common electrode 108 is applied with the voltage Vsl because it is connected to the third power feed line 163. Thus, positive polarity voltages corresponding to the gray-scale levels are written to the parallel capacitors consisting of the pixel capacitors 120 and the storage capacitors 130 in the first row and first column to the first row and 240th column.

Subsequently, the selection of the first scanning line 112 is completed, and the scanning signal Y1 attains an L level. At the same time, the second scanning line 112 is selected, so that the scanning signal Y2 attains an H level. As the scanning signal Y1 attains an L level, the TFTs 116 in the pixels of the first row and first column to the first row and 240th column turn off. For this reason, in the pixels 110 of the first row and first column to the first row and 240th column, the corresponding pixel electrodes 118 enter a high impedance state where the pixel electrodes 118 are not electrically connected to any components. On the other hand, in the common electrode driving circuit 170, the first row TFTs 171, 172 are turned off, so that the gate electrodes of the TFTs 173, 174 enter high impedance states. However, the gate electrodes of the TFTs 173, 174 are maintained in a state immediately before they enter high impedance states owing to their parasitic capacitances, that is, held at the H level and the L level, respectively, so that the TFTs 173, 174 continue to maintain the on state and the off state, respectively. Thus, the first common electrode 108, even when the selection of the first scanning line is completed and the scanning signal Y1 attains an L level, maintains the voltage Vsl because it is continuously connected to the third power feed line 163. Accordingly, since the other ends of the parallel capacitors consisting of the pixel capacitors 120 and the storage capacitors 130 in the first row and first column to the first row and 240th column are maintained at the voltage Vsl, the state of written voltages are not changed but maintained.

In addition, as the latch pulse Lp is output at the timing when the scanning signal Y2 attains an H level, the data line driving circuit 190 reads out the display data Da of the first, second, third, . . . , 240th column pixels in the second row and supplies the corresponding first, second, third, . . . , 240th data lines 114 with data signals X1, X2, X3, . . . , X240 of voltages which are converted to levels lower than the reference voltage Vsh by amounts specified by the display data Da. In this manner, for example, a voltage that is set to a level lower than the voltage Vsh by an amount specified by the display data Da of the second row and j-th column pixel 110 is applied to the j-th data line 114 as a data signal Xj. As the scanning signal Y2 attains an H level, the TFTs 116 in the pixels of the second row and first column to the second row and 240th column turn on, so that the data signals X1, X2, X3, . . . , X240 are applied to the pixel electrodes 118 of the pixels. On the other hand, during a period when the scanning signal Y2 is at an H level, the second row TFTs 171, 172 in the common electrode driving circuit 170 are turned on. Here, during a period when the scanning signal Y2 is at an H level, the signal Vg-a supplied to the first power feed line 161 is at an L level, and the signal Vg-b supplied to the second power feed line 162 is at an H level, so that the second row TFT 173 turns off and the second row TFT 174 turns on by the turning on of the second row TFTs 171, 172. For this reason, the second common electrode 108 is applied with the voltage Vsh because it is connected to the fourth power feed line 164. Thus, negative polarity voltages corresponding to the gray-scale levels are written to the parallel capacitors consisting of the pixel capacitors 120 and the storage capacitors 130 in the second row and first column to the second row and 240th column.

Subsequently, the selection of the second scanning line 112 is completed and the scanning signal Y2 attains an L level. At the same time, the third scanning line 112 is selected, so that the scanning signal Y3 attains an H level. Here, as the scanning signal Y2 attains an L level, the TFTs 116 in the pixels of the second row and first column to the second row and 240th column turn off. Thus, in each of the pixels 110 of the second row and first column to the second row and 240th column, the pixel electrode 118 enters a high impedance state. On the other hand, in the common electrode driving circuit 170, the second row TFTs 171, 172 are turned off, so that the gate electrodes of the TFTs 173, 174 enter high impedance states. However, the gate electrodes of the TFTs 173, 174 are held at the H level and the L level, respectively, owing to their parasitic capacitances, so that the second row TFTs 173, 174 continue to maintain the on state and the off state, respectively. Thus, the second row common electrode 108, even when the selection of the second scanning line is completed and the scanning signal Y2 attains an L level, maintains the voltage Vsh because it is continuously connected to the fourth power feed line 164. Accordingly, since the other ends of the parallel capacitors consisting of the pixel capacitors 120 and the storage capacitors 130 in the second row and first column to the second row and 240th column are maintained at the voltage Vsh, the state of written voltages are not changed but maintained.

In addition, as the scanning signal Y3 attains an H level, positive polarity voltages corresponding to the gray-scale levels are written to the parallel capacitors consisting of the pixel capacitors 120 and the storage capacitors 130 in the third row. Subsequently, as the scanning signal Y4 attains an H level, negative polarity voltages corresponding to the gray-scale levels are written to the parallel capacitors consisting of the pixel capacitors 120 and the storage capacitors 130 in the fourth row. The same operation will continue to the 320th row. By so doing, in the n-th frame, positive polarity voltages corresponding to the gray-scale levels are written to the parallel capacitors consisting of the pixel capacitors 120 and the storage capacitors 130 in the odd-numbered rows and the negative polarity voltages corresponding to the gray-scale levels are written to the parallel capacitors consisting of the pixel capacitors 120 and the storage capacitors 130 in the even-numbered rows. Thus, the voltages corresponding to the gray-scale levels are written to the parallel capacitors in all of the pixels, so that an image of one frame is displayed on the display area 100.

In the next (n+1)th frame, the relationship between signals Vg-a, Vg-b is changed as compared to the previous n-th frame, so that, when an odd-numbered scanning line 112 is selected, the common electrode 108 corresponding to the selected odd-numbered scanning line is connected to the fourth power feed line 164 to be applied with the voltage Vsh and maintains its connected state even when the selection of the scanning line is interrupted (the scanning signal attains an L level) thereafter, while, on the other hand, when an even-numbered scanning line 112 is selected, the common electrode 108 corresponding to the selected even-numbered scanning line is connected to the third power feed line 163 to be applied with the voltage Vsl and maintains its connected state even when the selection of the scanning line is interrupted thereafter. For this reason, in the (n+1)th frame, negative polarity voltages corresponding to the gray-scale levels are written to the parallel capacitors consisting of the pixel capacitors 120 and the storage capacitors 130 in the odd-numbered rows and positive polarity voltages corresponding to the gray-scale levels are written to the parallel capacitors in the even-numbered rows, and then the written voltage states are maintained.

Figure 5:
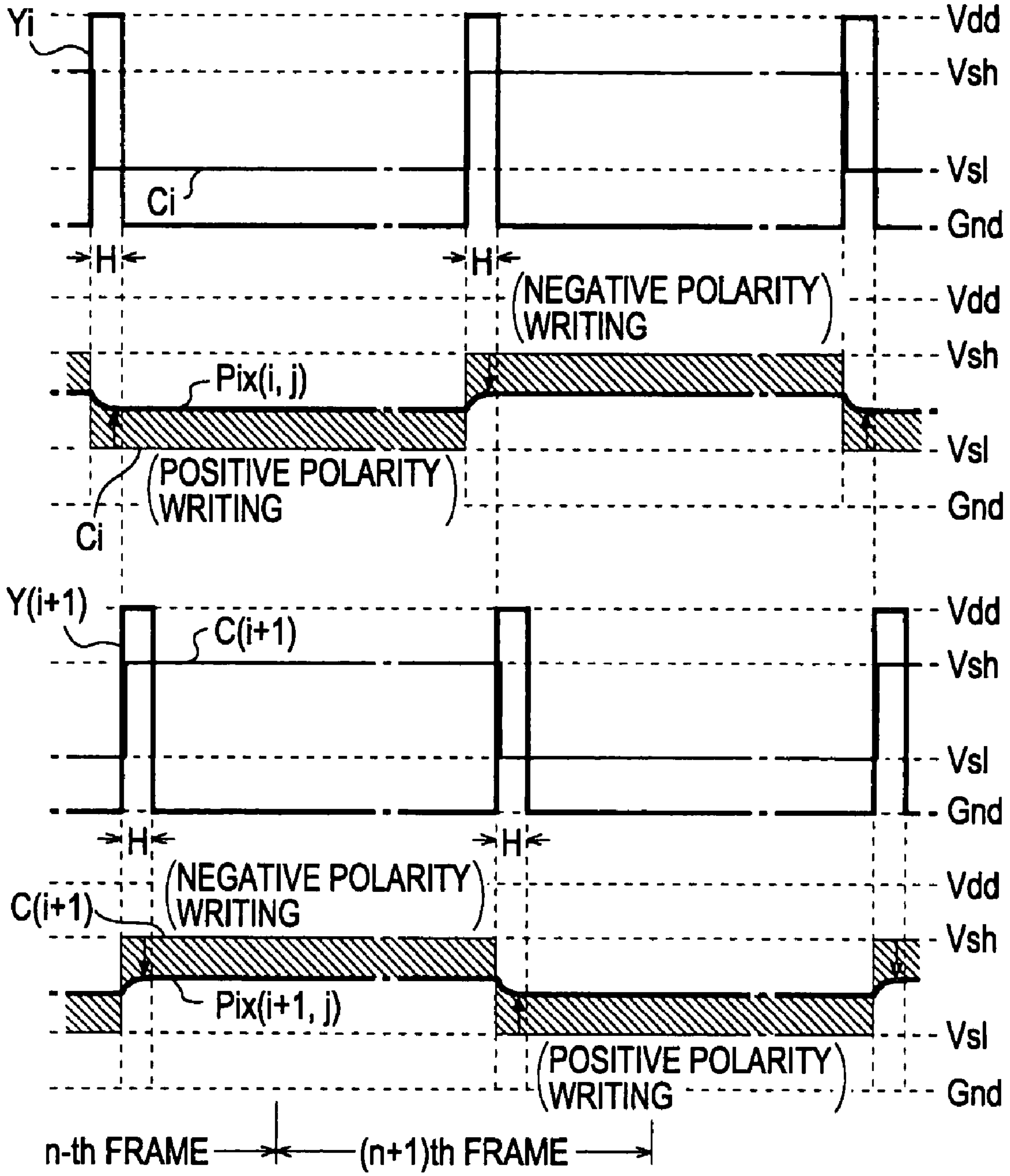
FIG. 5 is a view showing the waveforms of voltages applied to pixel electrodes in the electro-optical device.

Next, the writing of voltage according to the present embodiment will be described with reference to FIG. 5. FIG. 5 is a view showing a voltage Pix(i,j) applied to the i-th row and j-th column pixel electrode 118 and a voltage Pix(i+1,j) applied to the (i+1)th row and j-th column pixel electrode 118 with respect to the corresponding scanning signals Yi, Y(i+1). Note that the vertical scale that indicates a voltage in FIG. 5 is enlarged as compared to the vertical scale of FIG. 4 for the purpose of easy description. During a period of the n-th frame when the polarity specifying signal Pol is at an H level, the positive polarity writing is specified for the odd-numbered i-th row pixels, so that the j-th data line 114 is supplied with a data signal Xj of a voltage (which is indicated by an arrow ↑ in FIG. 5) higher than the voltage Vsl by an amount corresponding to the gray-scale level of the i-th row and j-th column pixel over a period during which the scanning signal Yi is at an H level. In this manner, a differential voltage between a voltage of the data signal Xj and the voltage Vsl of the common electrode 108, that is, a positive polarity voltage corresponding to the gray-scale level, is written to the i-th row and j-th column parallel capacitors consisting of the pixel capacitor 120 and the storage capacitor 130.

Here, as the scanning signal Yi attains an L level, the i-th row and j-th column pixel electrode 118 enters a high impedance state. However, the odd-numbered i-th common electrode 108, when the scanning signal Yi attains an H level in the n-th frame, is connected to the third power feed line 163 to be applied with the voltage Vsl. This connected state is maintained until the scanning signal Yi attains an H level again in the next (n+1)th frame. For this reason, the voltage Pix(i,j) of the i-th row and j-th column pixel electrode 118 does not change from the voltage (voltage of the data signal Xj) which is applied when the scanning signal Yi is at an H level, so that a voltage effective value (a hatched portion) held by the parallel capacitors consisting of the pixel capacitor 120 and the storage capacitor 130 is not influenced.

Note that, during a period of the (n+1)th frame when the polarity specifying signal Pol is at an L level, the negative polarity writing is specified for the odd-numbered i-th row pixel, so that the j-th data line 114 is supplied with the data signal Xj of a voltage (which is indicated by an arrow ↓) lower than the voltage Vsh by an amount corresponding to the gray-scale level of the i-th row and j-th column pixel over a period during which the scanning signal Yi is at an H level. In this manner, a differential voltage between a voltage of the data signal Xj and the voltage Vsh of the common electrode 108, that is, a negative polarity voltage corresponding to the gray-scale level, is written to the i-th row and j-th column parallel capacitors consisting of the pixel capacitor 120 and the storage capacitor 130. As the scanning signal Yi attains an L level, the i-th row and j-th column pixel electrode 118 enters a high impedance state. However, the odd-numbered i-th common electrode 108, when the scanning signal Yi attains an H level in the (n+1)th frame, is connected to the fourth power feed line 164 to be applied with the voltage Vsh. This connected state is maintained until the scanning signal Yi attains an H level again in the next frame. Hence, a voltage effective value (a hatched portion) held by the parallel capacitor consisting of the pixel capacitor 120 and the storage capacitor 130 is not influenced.

In the n-th frame during which the positive polarity writing is specified for the i-th row, the negative polarity writing is specified for the (i+1)th row. In the (n+1)th frame during which the negative polarity writing is specified for the i-th row, the positive polarity writing is specified for the (i+1)th row. Thus, in the present embodiment, the writing polarity is inverted every scanning line.

According to the above embodiment, the common electrode 108 for which the positive polarity writing is specified, when the corresponding scanning line 112 is selected, is applied with the relatively low voltage Vsl and a voltage higher than the voltage Vsl by an amount corresponding to the gray-scale level is supplied as a data signal, while, on the other hand, the common electrode 108 for which the negative polarity writing is specified, when the corresponding scanning line 112 is selected, is applied with the relatively high voltage Vsh and a voltage lower than the voltage Vsh by an amount corresponding to the gray-scale level is supplied as a data signal. Thus, the voltage amplitude of the data signal is smaller in the present embodiment than when the voltage applied to the common electrode 108 is constant, so that it is possible to simplify a configuration by that much by suppressing a withstand voltage required for the component elements of the data line driving circuit 190 and also possible to reduce a loss of electric power consumed due to a variation in voltage.

Incidentally, each of the common electrodes 108 (common lines 108*e*) intersects with the first to 240th data lines 114 as described above via a gate insulation film, or the like, so that variations in voltages of these data lines 114, that is, variations of the data signals X1 to X240, are transmitted to the common electrode 108 through parasitic capacitances. For this reason, the common electrode 108, when there is a period during which the common electrode 108 is not electrically connected anywhere, is influenced by variations in voltages of the data lines (variations in voltages of the data signals X1 to X240) and the voltage of the common electrode 108 is shifted from the voltage Vsl or Vsh. Even when the voltage of the common electrode 108 is shifted, when the pixel electrode 118 is completely in a high impedance state, a voltage held by the pixel capacitor 120 and the storage capacitor 130 does not fluctuate. However, there is not a little off leak in the TFT 116. Here, the TFTs 116 are uniform over the pixels and, therefore, the influence on image display is small even with an off leak, but the amount of voltage shift of the common electrode 108 varies every row. Thus, when the voltage of the common electrode 108 is shifted from the voltage Vsl or Vsh, a voltage held by the pixel capacitor 120 and the storage capacitor 130, the other ends of which are connected to the common electrode, fluctuates. Hence, this may adversely affect a visual quality.

In contrast to this, in the present embodiment, as regards the odd-numbered i-th row, for example, when an i-th scanning line 112 is selected in the n-th frame to have the scanning signal Yi attain an H level, the i-th row TFTs 171, 172 turn on to turn on the TFT 173 and to turn off the TFT 174, and the H level voltage and the L level voltage are respectively written to the parasitic capacitances in the gate electrodes of the TFTs 173, 174. In this manner, even when the selection of the i-th scanning line 112 is completed and the scanning signal Yi attains an L level, the i-th row TFTs 173, 174 maintain the on state and the off state, respectively. Eventually, the odd-numbered i-th common electrode 108 continues to be connected to the third power feed line 163. On the other hand, the even-numbered (i+1)th common electrode 108 continues to be connected to the fourth power feed line 164. Thus, in the present embodiment, each of the common electrodes 108 is always applied with the voltage Vsl or Vsh and does not enter a high impedance state, so that it is possible to obviate a decrease in display quality due to fluctuation in voltage of the common electrode.

In addition, the odd-numbered i-th common electrode 108, after the scanning signal Yi attains an H level in the n-th frame, is connected to the third power feed line 163 to be applied with the voltage Vsl, while, on the other hand, when the scanning signal Yi attains an H level again in the (n+1)th frame, is then connected to the fourth power feed line 164 to be applied with the voltage Vsh. In addition, the even-numbered (i+1)th common electrode 108, after the scanning signal Yi attains an H level in the n-th frame, is connected to the fourth power feed line 164 to be applied with the voltage Vsh, while, on the other hand, when the scanning signal Yi attains an H level again in the (n+1)th frame, is then connected to the third power feed line 163 to be applied with the voltage Vsl. Because each of the common electrodes 108 sequentially switches a voltage applied thereto at the timing when the corresponding scanning line is selected (see FIG. 5), it does not occur that voltages switch at the timing of beginning (end) of a frame all at once (see FIG. 7, which will be described later) and the voltages of the common signals Vc-a, Vc-b are constant, so that it is possible to suppress a loss of electric power consumed owing to parasitic capacitances in the third power feed line 163 and the fourth power feed line 164.

Alternative Embodiment to First Embodiment

Figure 6:
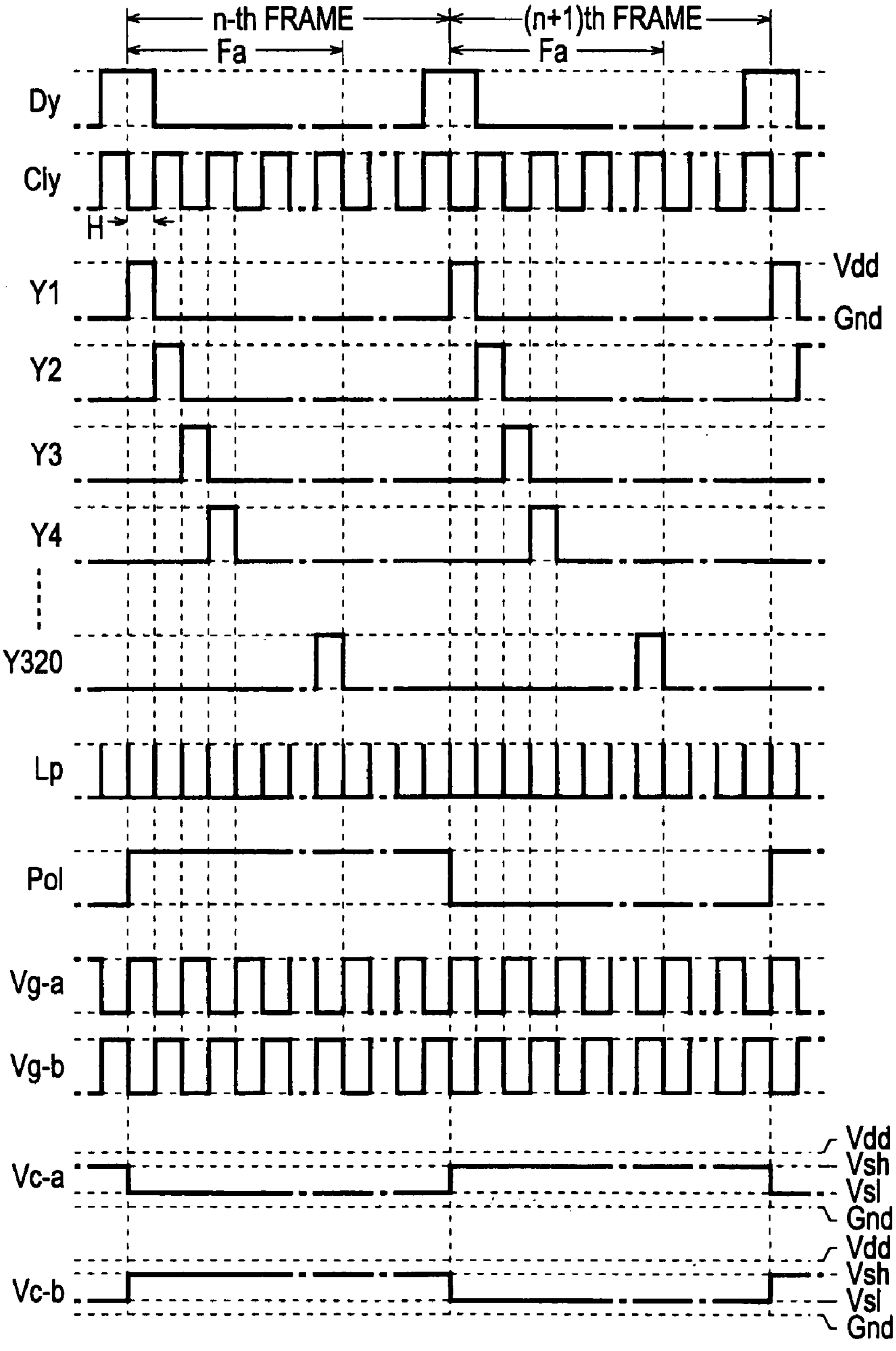
FIG. 6 is a view illustrating another operation of the electro-optical device.
Figure 7:
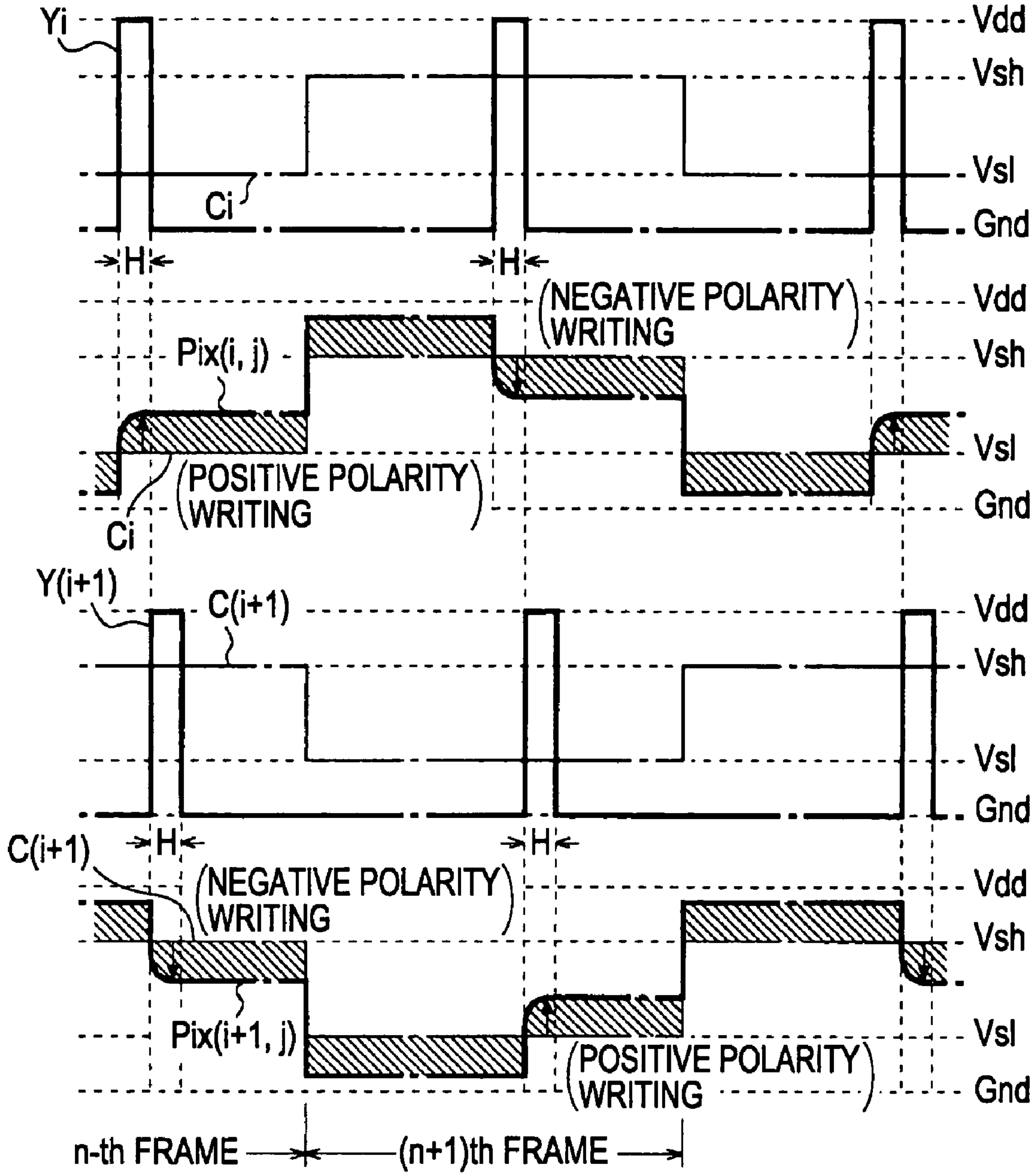
FIG. 7 is a view showing the waveforms of voltages applied to the pixel electrodes on the basis of the another operation.

In the above description, the voltages of the common signals Vc-a, Vc-b are constant at the voltages Vsl, Vsh, respectively, irrespective of the logical level of the polarity specifying signal Pol. However, it is applicable that, as shown in FIG. 6, the voltages of the common signals Vc-a, Vc-b are switched between the voltages Vsl, Vsh in accordance with the logical level of the polarity specifying signal Pol. When the voltages of the common signals Vc-a, Vc-b are switched between the voltages Vsl, Vsh in accordance with the polarity specifying signal Pol, the signals Vg-a, Vg-b in the (n+1)th frame need to have the same waveforms as in the n-th frame, as shown in FIG. 6. Thus, when the signals Vg-a, Vg-b and the common signals Vc-a, Vc-b employ the waveforms as shown in FIG. 6, the odd-numbered i-th common electrode 108 is connected to the third power feed line 163, while the even-numbered (i+1)th common electrode 108 is connected to the fourth power feed line 164. For this reason, as shown in FIG. 7, the odd-numbered i-th common electrode 108 is applied with the voltage Vsl over a period of one frame during which the polarity specifying signal Pol is at an H level, and is applied with the voltage Vsh over a period of one frame during which the polarity specifying signal Pol is at an L level. On the other hand, the even-numbered (i+1)th common electrode 108 is applied with the voltage Vsh over a period of one frame during which the polarity specifying signal Pol is at an H level, and is applied with the voltage Vsl over a period of one frame during which the polarity specifying signal Pol is at an L level.

Here, when the positive polarity writing is specified for the i-th row pixels, the i-th common electrode 108 is applied with the voltage Vsl, and, over a period during which the scanning signal Yi is at an H level, the j-th data line 114 is supplied with the data signal Xj of a voltage (which is indicated by an arrow ↑ in the drawing) higher than the voltage Vsl by an amount corresponding to the gray-scale level of the i-th row and j-th column pixel. In this manner, a differential voltage between a voltage of the data signal Xj and the voltage Vsl of the common electrode 108, that is, a positive polarity voltage corresponding to the gray-scale level, is written to the i-th row and j-th column parallel capacitors consisting of the pixel capacitor 120 and the storage capacitor 130. As described above, the common signal Vc-a supplied to the third power feed line 163 and the common signal Vc-b supplied to the fourth power feed line 164 switch voltages at the timing of beginning (end) of each frame, respectively, so that the voltage of each common electrode 108 is also switched at this timing. However, at this timing, because the scanning signal Yi is at an L level, the i-th row and j-th column pixel electrode 118 is in a high impedance state, the voltage Pix(i,j) of the i-th row and j-th column pixel electrode, when the voltage of the common electrode 108 is switched as shown in the drawing, changes in the same direction by the same amount at the same time, so that a voltage effective value (a hatched portion) held by the parallel capacitors consisting of the pixel capacitor 120 and the storage capacitor 130 is not influenced.

When a period of one frame has elapsed and the scanning signal Yi attains an H level again, the negative polarity writing will be specified. Thus, the j-th data line 114 is supplied with the data signal Xj of a voltage (which is indicated by an arrow ↓) lower than the voltage Vsh by an amount corresponding to the gray-scale level of the i-th row and j-th column pixel. At this time, since the i-th common electrode 108 is applied with the voltage Vsh, a voltage corresponding to the gray-scale level is inverted in polarity and then written to the parallel capacitors consisting of the i-th row and j-th column pixel capacitor 120 and storage capacitor 130. Note that the negative polarity writing is specified for the (i+1)th row in a frame when the positive polarity writing is specified for the i-th row, and the positive polarity writing is specified for the (i+1)th row in a frame when the negative polarity writing is specified for the i-th row, so that, in this example as well, the writing polarity is inverted every scanning line.

Figure 8:
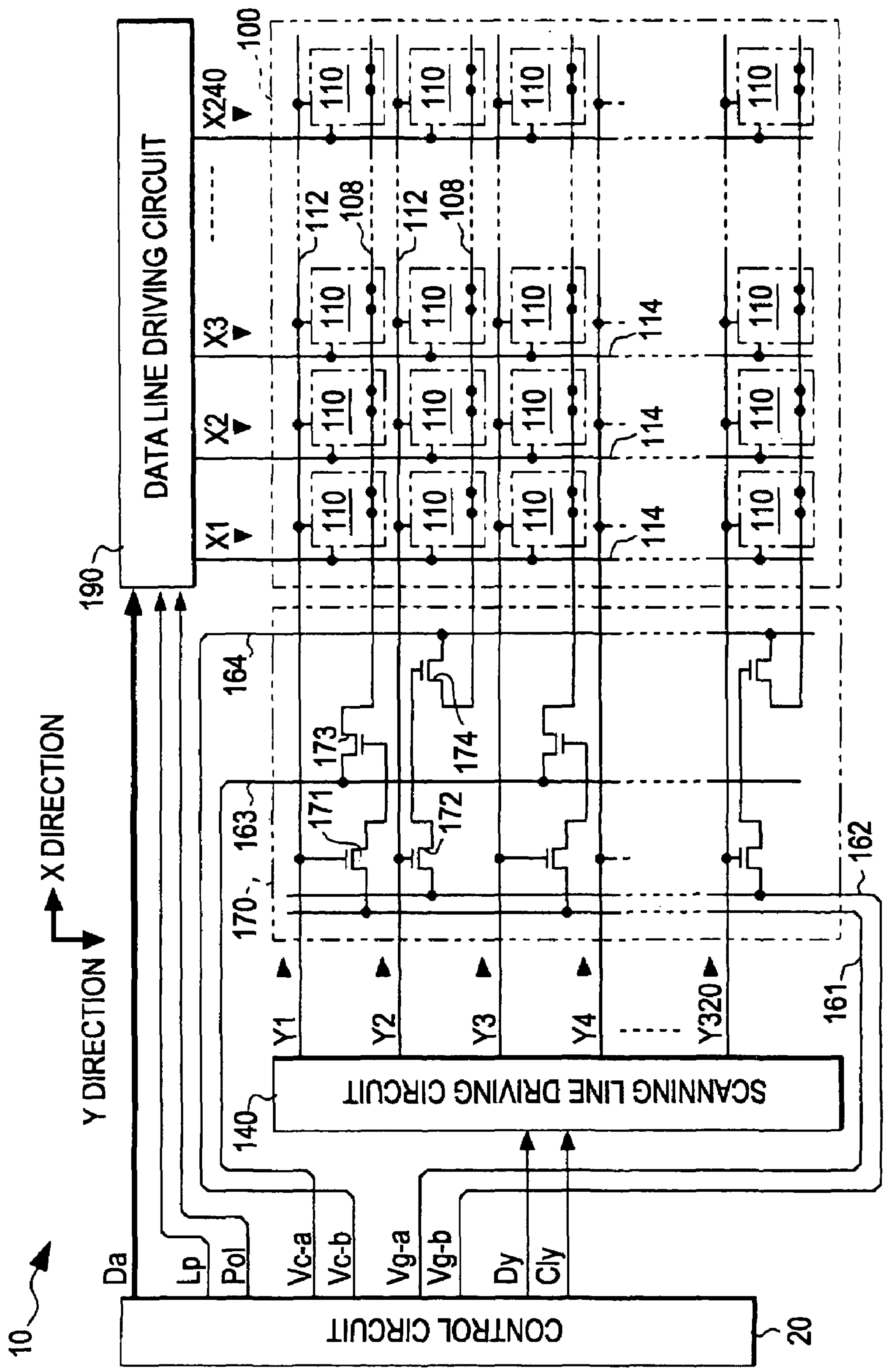
FIG. 8 is a view showing a configuration of an electro-optical device according to an alternative embodiment of the first embodiment.

Incidentally, when the signals Vg-a, Vg-b and the common signals Vc-a, Vc-b employ the waveforms shown in FIG. 6, the odd-numbered i-th common electrode 108 is connected to the third power feed line 163 and the even-numbered (i+1)th common electrode 108 is connected to the fourth power feed line 164, so that the odd-numbered i-th common electrode 108 is not connected to the fourth power feed line 164 and the even-numbered (i+1)th common electrode 108 is not connected to the third power feed line 163. For this reason, as shown in FIG. 8, the TFTs 172, 174 of the odd-numbered rows and the TFTs 171, 173 of the even-numbered rows are unnecessary in the common electrode driving circuit 170, so that it is advantageous in terms of simplification of configuration. However, in this configuration, in the odd-numbered rows and the even-numbered rows, the destination for connection of the common electrodes 108 (that is, the third or fourth power feed line) is fixed, and, if there is a characteristic difference between the TFTs 173 of the odd-numbered rows and the TFTs 174 of the even-numbered rows, even when voltages corresponding to the same gray-scale levels are attempted to be written with the same writing polarity, the voltages that are actually held by the parallel capacitors consisting of the pixel capacitors 120 and the storage capacitors 130 in the odd-numbered rows may possibly be different from those of the even-numbered rows. For this reason, by applying the waveforms shown in FIG. 4 to the configuration shown in FIG. 1, the configuration, in which the TFTs 173, 174 are alternately turned on and off every period of one frame when focusing on the same one row, is more advantageous in that voltages are uniformly held by the parallel capacitors, each of which consists of the pixel capacitor 120 and the storage capacitor 130.

Figure 16:
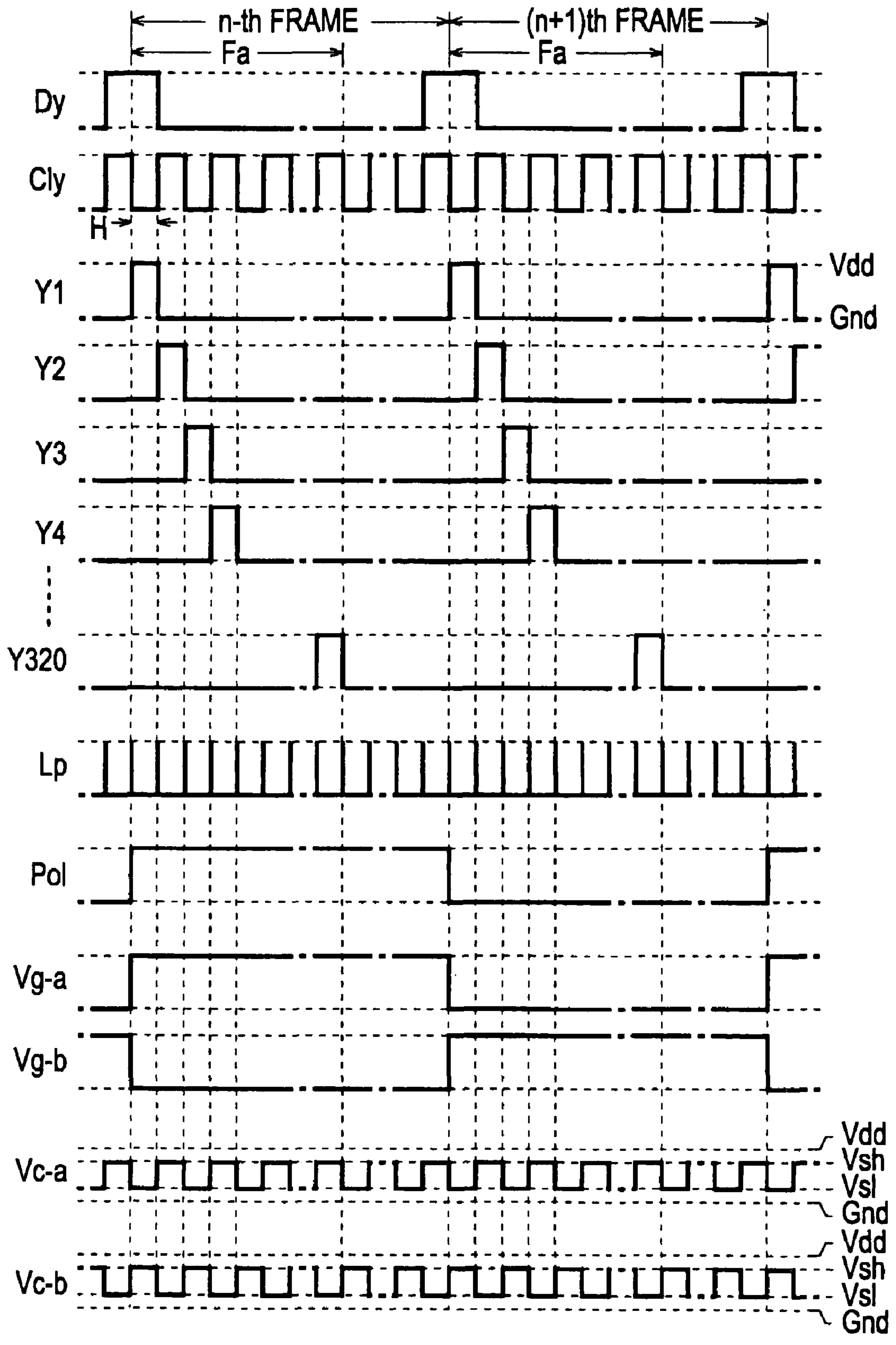
FIG. 16 is a view illustrating the operation of the electro-optical device according to the third embodiment.
Figure 17:
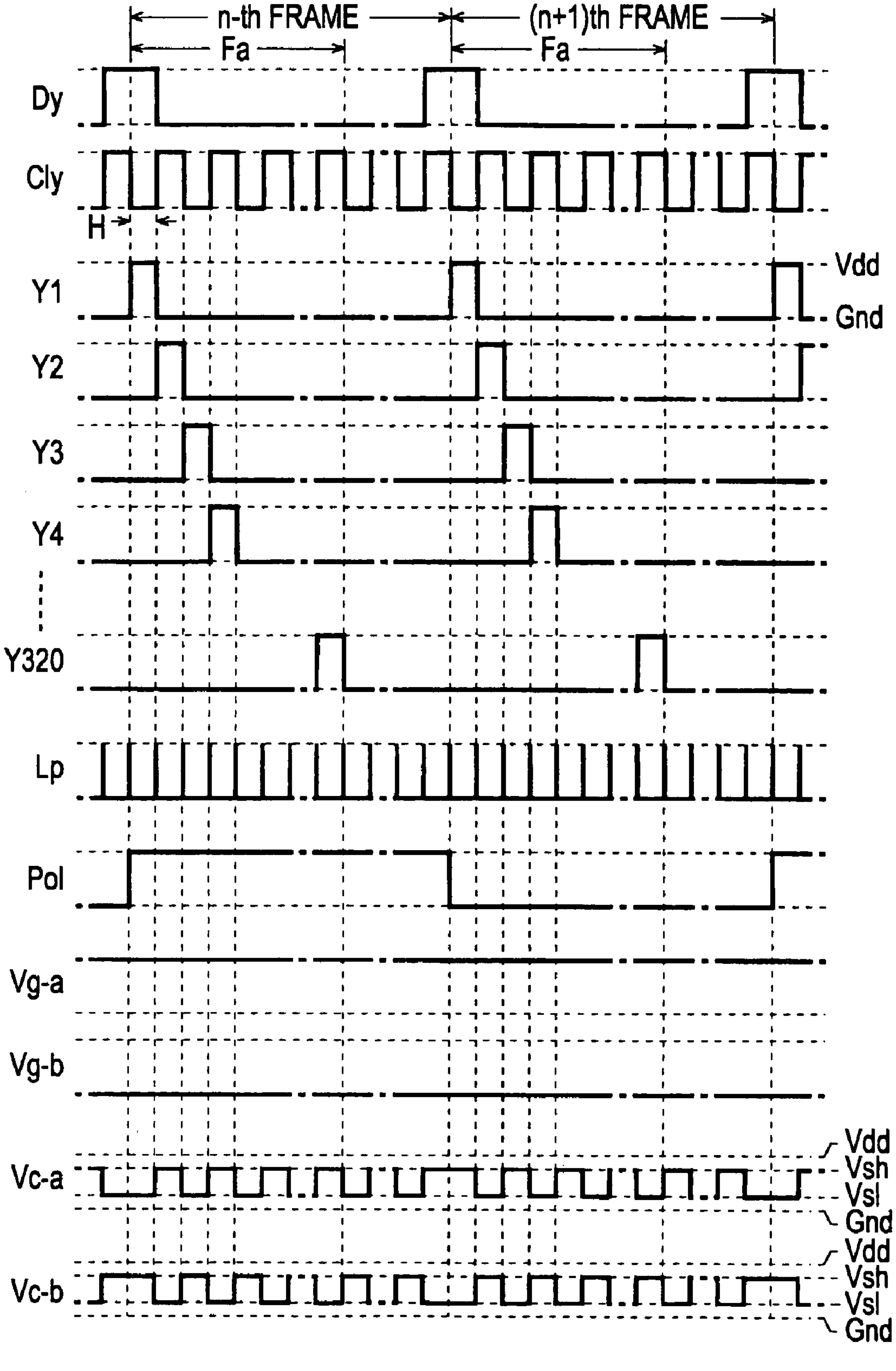
FIG. 17 is a view illustrating the operation of the electro-optical device according to the third embodiment.

Note that, as shown in FIG. 16 and FIG. 17, which will be described later, for example, the signals Vg-a, Vg-b may be respectively made constant at an H level and an L level over a period of one frame, while, on the other hand, the common signals Vc-a, Vc-b may be switched every horizontal scanning period (H). The signals Vg-a, Vg-b and the common signals Vc-a, Vc-b may employ various waveforms other than those shown in FIG. 4 and FIG. 6.

Second Embodiment

An electro-optical device according to a second embodiment of the invention will now be described. In the above described first embodiment, a row (line) inversion drive method in which a polarity written into a pixel is inverted every row is employed. However, in the second embodiment, a dot inversion drive method in which a writing polarity is inverted not only every row but also every column is employed.

Figure 9:
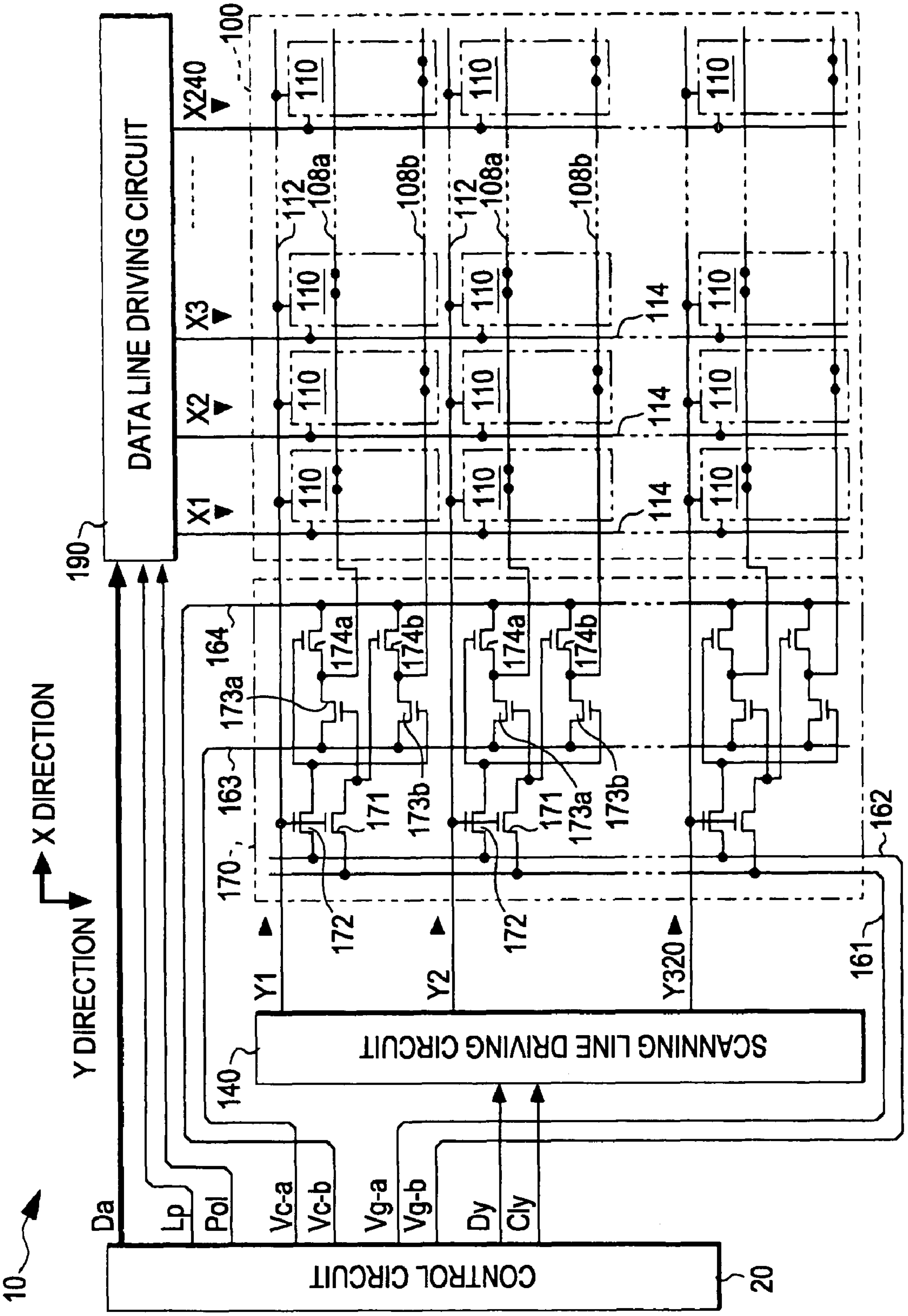
FIG. 9 is a view showing a configuration of an electro-optical device according to a second embodiment of the invention.
Figure 10:
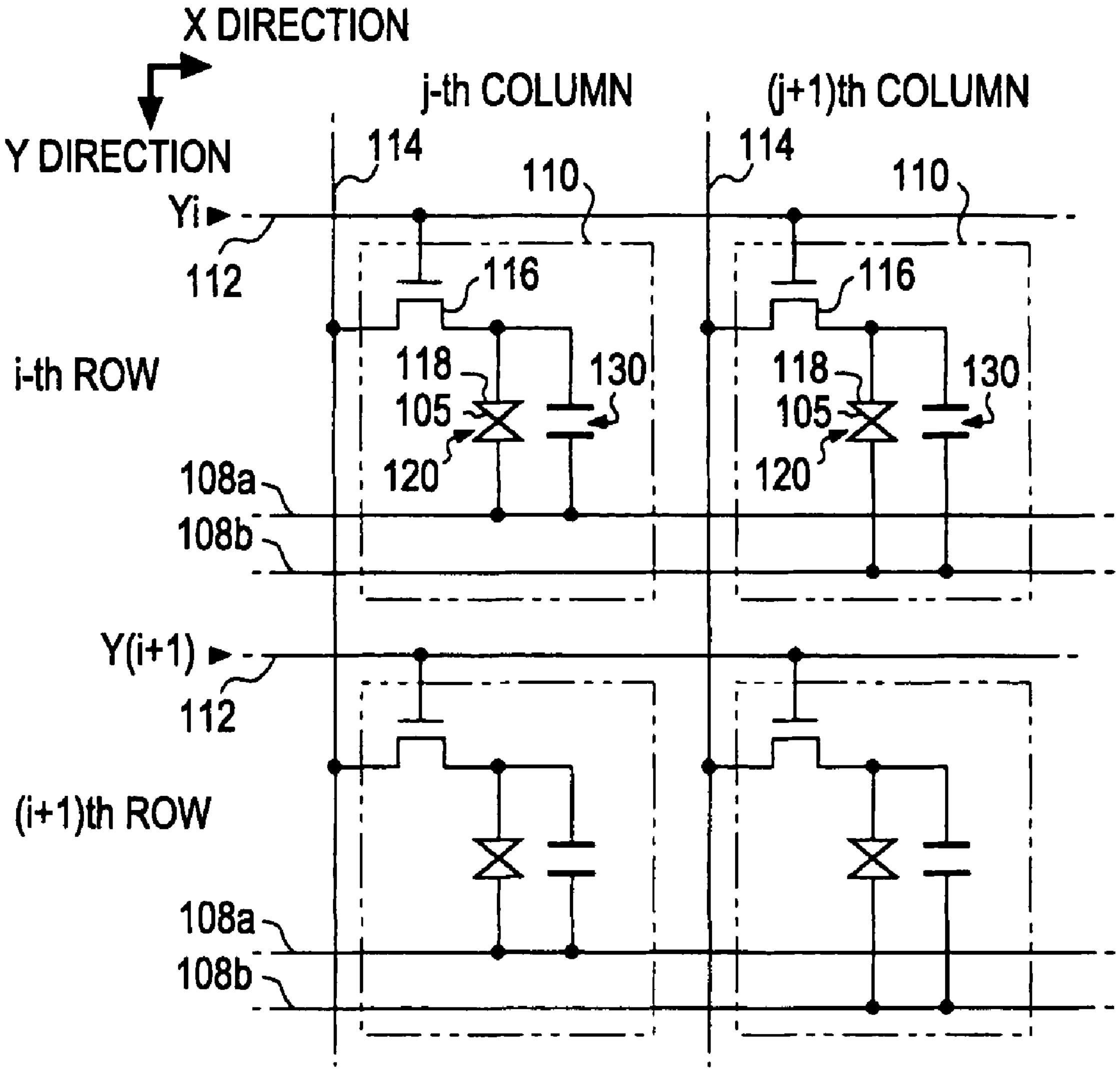
FIG. 10 is a view showing pixels in the electro-optical device.
Figure 11:
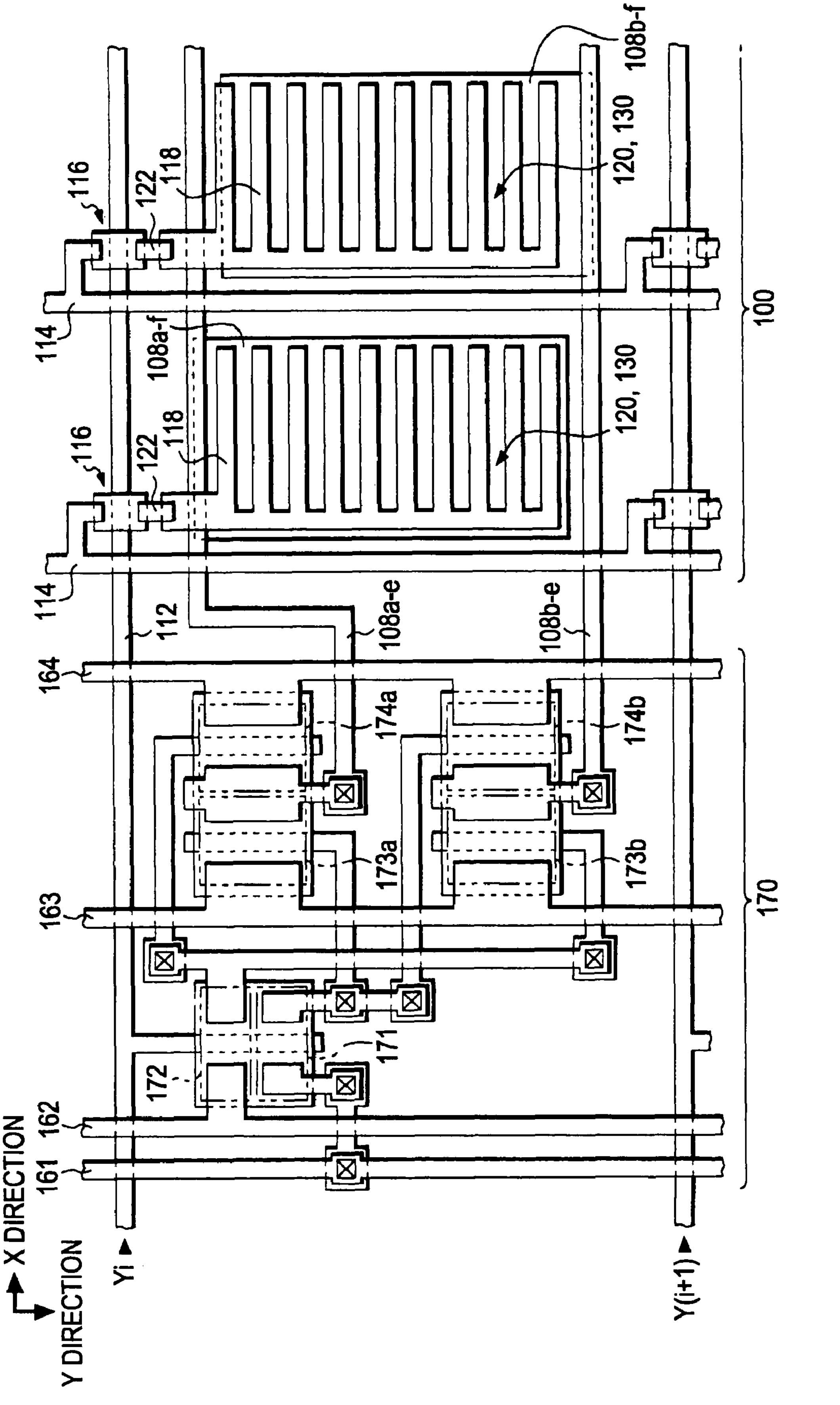
FIG. 11 is a plan view showing a relevant configuration in an element substrate of the electro-optical device.

FIG. 9 is a block diagram showing a configuration of the electro-optical device 10 according to the second embodiment. FIG. 10 is a view showing a configuration of the pixels in the electro-optical device 10. FIG. 11 is a plan view showing the portions, of the element substrate, around the boundary between the display area 100 and the common electrode driving circuit 170. As shown in these drawings, in the second embodiment, in the display area 100, a first common electrode **108*a* and a second common electrode 108*b* are provided in correspondence with each of the scanning lines 112, wherein, in each of the pixels 110 in the odd-numbered (1, 3, 5, . . . , 239) columns, the other ends of each pixel capacitor 120 and each storage capacitor 130 are connected to the corresponding first common electrode 108*a*, while, in each of the pixels 110 in the even-numbered (2, 4, 6, . . . , 240) columns, the other ends of each pixel capacitor 120 and each storage capacitor 130 are connected to the corresponding second common electrode 108*b***.

In addition, in the second embodiment, in the common electrode driving circuit 170, in order to drive the first common electrode **108*a* and the second common electrode 108*b*, which are provided in correspondence with a corresponding one of the scanning lines 112, the TFT 173 in the case of the first embodiment (see FIG. 1) is divided into two TFTs 173*a*, 173*b* and, similarly, the TFT 174 is divided into two TFTs 174*a*, 174*b*, respectively. Specifically, the drain electrode of the TFT 171 is connected to the gate electrode of the TFT 173*a* and the gate electrode of the TFT 174*b*, respectively, and the drain electrode of the TFT 172 is connected to the gate electrode of the TFT 173*b* and the gate electrode of the TFT 174*a*, respectively. Then, the source electrode of the TFT 173*a* is connected to the third power feed line 163, the source electrode of the TFT 174*a* is connected to the fourth power feed line 164, and the drain electrodes of the TFTs 173*a*, 174*a* are commonly connected to the first common electrode 108*a*. On the other hand, the source electrode of the TFT 173*b* is connected to the third power feed line 163, the source electrode of the TFT 174*b* is connected to the fourth power feed line 164, and the drain electrodes of the TFTs 173*b*, 174*b* are commonly connected to the second common electrode 108***b*. Thus, because the TFT 174*b* is also turned on when the TFT 173*a* is turned on, when the first common electrode 108*a* is connected to the third power feed line 163, the second common electrode 108*b* is connected to the fourth power feed line 164. On the other hand, because the TFT 173*b* is turned on when the TFT 174*a* is turned on, when the first common electrode 108*a* is connected to the fourth power feed line 164, the second common electrode 108*b* is connected to the third power feed line 163.

In the second embodiment that employs a dot inversion drive method, the polarity specifying signal Pol specifies a writing polarity as follows. That is, in the present embodiment, the polarity specifying signal Pol, when it is at an H level, specifies positive polarity writing for pixels in the odd-numbered rows and odd-numbered columns and in the even-numbered rows and even-numbered columns, and specifies negative polarity writing for pixels in the odd-numbered rows and even-numbered columns and in the even-numbered rows and odd-numbered columns. The polarity specifying signal Pol, when it is at an L level, specifies negative polarity writing for pixels in the odd-numbered rows and odd-numbered columns and in the even-numbered rows and even-numbered columns, and specifies positive polarity writing for pixels in the odd-numbered rows and even-numbered columns and in the even-numbered rows and odd-numbered columns.

In the second embodiment, the polarity specifying signal Pol, the signals Vg-a, Vg-b, the common signals Vc-a, Vc-b employ the waveforms shown in FIG. 4 or in FIG. 6 as in the case of the first embodiment. When the waveforms shown in FIG. 4 is employed, during a period when an odd-numbered i-th scanning line 112 is selected in the n-th frame and the scanning signal Yi is at an H level, the signals Vg-a, Vg-b are respectively at an H level and at an L level, so that, in the i-th row in the common electrode driving circuit 170, as the TFTs 171, 172 turn on, the TFT 173*a* and TFT 174*b* turn on and the TFT 173*b* and TFT 174*a* turn off. For this reason, the i-th first common electrode 108*a* is connected to the third power feed line 163 to be supplied with the voltage Vsl and the i-th second common electrode 108*b* is connected to the fourth power feed line 164 to be supplied with the voltage Vsh. On the other hand, because the polarity specifying signal Pol is at an H level in the n-th frame, during a period when the i-th scanning line 112 is selected, the data line driving circuit 190 outputs data signals of voltages higher than the voltage Vsl by amounts corresponding to the gray-scale levels to the pixels in the odd-numbered columns and outputs data signals of voltages lower than the voltage Vsh by amounts corresponding to the gray-scale levels to the pixels in the even-numbered columns. In this manner, in the odd-numbered i-th row, the positive polarity writing is executed in each of the pixels 110 in the odd-numbered columns while the negative polarity writing is executed in each of the pixels 110 in the even-numbered columns, and the voltages of each first common electrode 108*a* and each second common electrode 108*b* are maintained.

In addition, during a period when the even-numbered (i+1)th scanning line 112 is selected in the n-th frame and the scanning signal Y(i+1) is at an H level, the signals Vg-a, Vg-b are inverted to attain an L level and an H level, respectively, so that, in the (i+1)th row in the common electrode driving circuit 170, as the TFTs 171, 172 turn on, the TFT 173*a* and TFT 174*b* turn off and the TFT 173*b* and TFT 174*a* turn on. For this reason, the (i+1)th first common electrode 108*a* is applied with the voltage Vsh and the (i+1)th second common electrode 108*b* is applied with the voltage Vsl. On the other hand, during a period when the even-numbered (i+1)th scanning line 112 is selected, the data line driving circuit 190 outputs data signals of voltages lower than the voltage Vsh by amounts corresponding to the gray-scale levels to the pixels in the odd-numbered columns and outputs data signals of voltages higher than the voltage Vsl by amounts corresponding to the gray-scale levels to the pixels in the even-numbered columns. In this manner, in the even-numbered (i+1)th row, the negative polarity writing is executed in each of the pixels 110 in the odd-numbered columns while the positive polarity writing is executed in each of the pixels 110 in the even-numbered columns.

During the (n+1)th frame, the polarity specifying signal Pol is inverted to an L level and the logical levels of the signals Vg-a, Vg-b are exchanged, so that the TFT 173*b* and the TFT 174*a* are turned on (the TFT 173*a* and the TFT 174*b* are turned off) in the odd-numbered i-th row and the TFT 173*a* and the TFT 174*b* are turned on (the TFT 173*b* and the TFT 174*a* are turned off) in the even-numbered (i+1)th row. For this reason, the odd-numbered i-th first common electrode 108*a* is connected to the fourth power feed line 164 to be applied with the voltage Vsh and the odd-numbered i-th second common electrode 108*b* is connected to the third power feed line 163 to be applied with the voltage Vsl, while, on the other hand, the even-numbered (i+1)th first common electrode 108*a* is connected to the third power feed line 163 to be applied with the voltage Vsl and the even-numbered (i+1)th second common electrode 108*b* is connected to the fourth power feed line 164 to be applied with the voltage Vsh. Thus, during the (n+1)th frame, in the odd-numbered i-th row, the negative polarity writing is executed for each of the pixels 110 in the odd-numbered columns and the positive polarity writing is executed for each of the pixels 110 in the even-numbered columns, while, on the other hand, in the even-numbered (i+1)th row, the positive polarity writing is executed for each of the pixels 110 in the odd-numbered columns and the negative polarity writing is executed for each of the pixels 110 in the even-numbered columns. Here, the above description is given in the case where the polarity specifying signal Pol, the signals Vg-a, Vg-b and the common signals Vc-a, Vc-b employ the waveforms shown in FIG. 4 but may also employ the waveforms shown in FIG. 6.

According to the second embodiment described above, it prevents a decrease in display quality due to fluctuation in voltages of the first common electrode 108*a* and the second common electrode 108*b* and further employs a dot inversion drive method in which the writing polarity for pixels are alternately inverted every row and every column, so that it is possible to achieve a high quality display that has a high contrast ratio and that suppresses a flicker. Note that, in this embodiment, the other ends of the pixel capacitor 120 and storage capacitor 130 of each pixel in the odd-numbered columns are connected to the first common electrode 108*a*, and the other ends of the pixel capacitor 120 and storage capacitor 130 of each pixel in the even-numbered columns are connected to the second common electrode 108*b*. However, if the attention is paid to that the meaning of the polarity specifying signal Pol is inverted, it is applicable that the other ends of the pixel capacitor 120 and storage capacitor 130 of each pixel in the odd-numbered columns are connected to the second common electrode 108*b* and the other ends of the pixel capacitor 120 and storage capacitor 130 of each pixel in the even-numbered columns are connected to the first common electrode 108*a*.

Note that the first common electrode 108*a* shown in FIG. 9 and FIG. 10 is divided into a first common line 108*a-e*, that extends parallel to the scanning lines 112, and a rectangular electrode 108*a-f*, on which the pixel electrode 118 is laminated via a protection insulation layer as shown in FIG. 11 and, similarly, the second common electrode 108*b* shown in FIG. 9 and FIG. 10 is divided into a second common line 108*b-e*, that extends parallel to the scanning line 112, and a rectangular electrode 108*b-f*, on which the pixel electrode 118 is laminated via a protection insulation layer as shown in FIG. 11.

Third Embodiment

An electro-optical device according to a third embodiment of the invention will now be described. In the above described second embodiment, in order to perform a dot inversion drive method, two common electrodes are provided for each of the scanning lines 112. However, in the third embodiment, only one common electrode is provided for each of the scanning lines 112.

Figure 12:
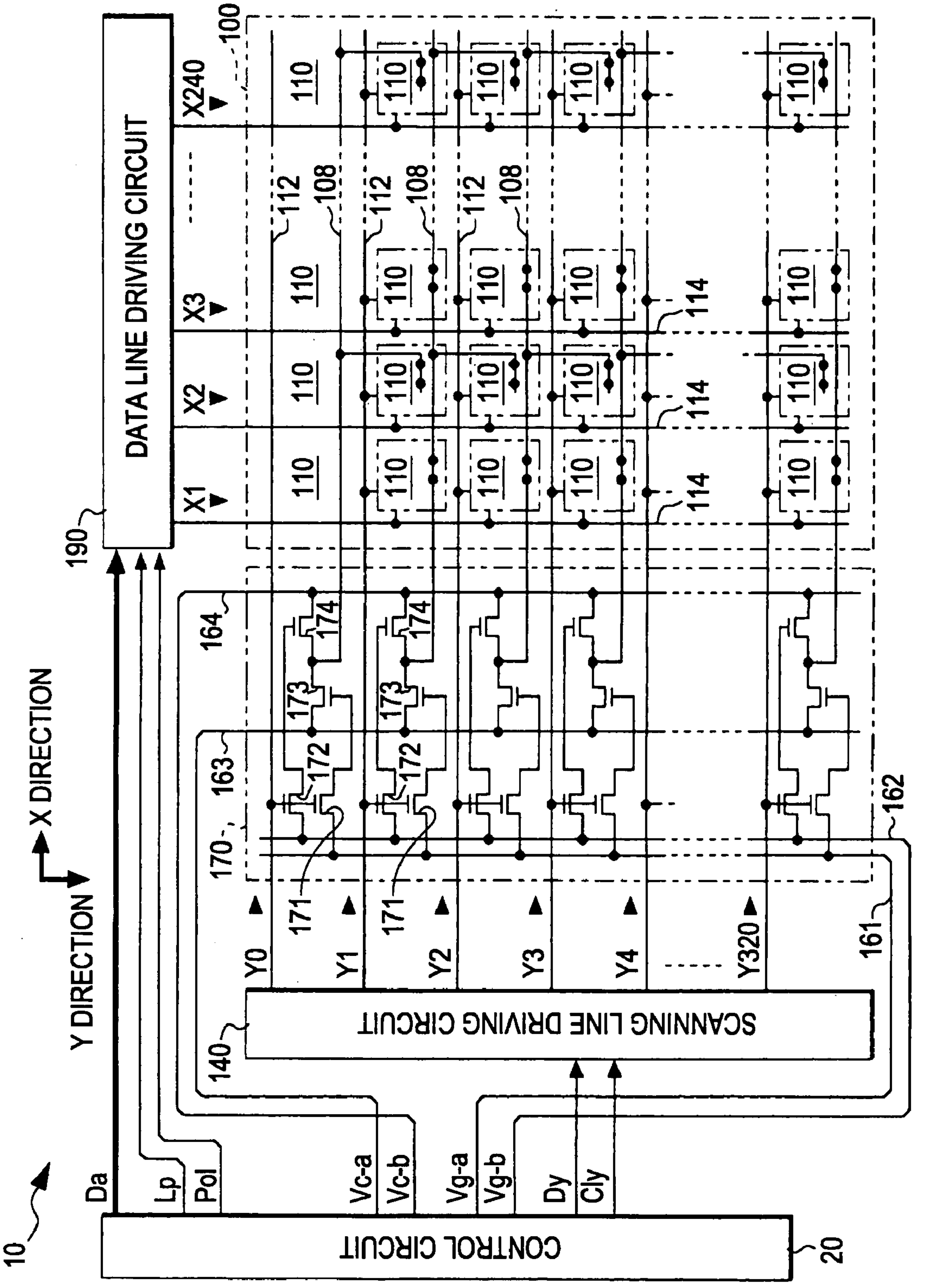
FIG. 12 is a view showing a configuration of an electro-optical device according to a third embodiment of the invention.
Figure 13:
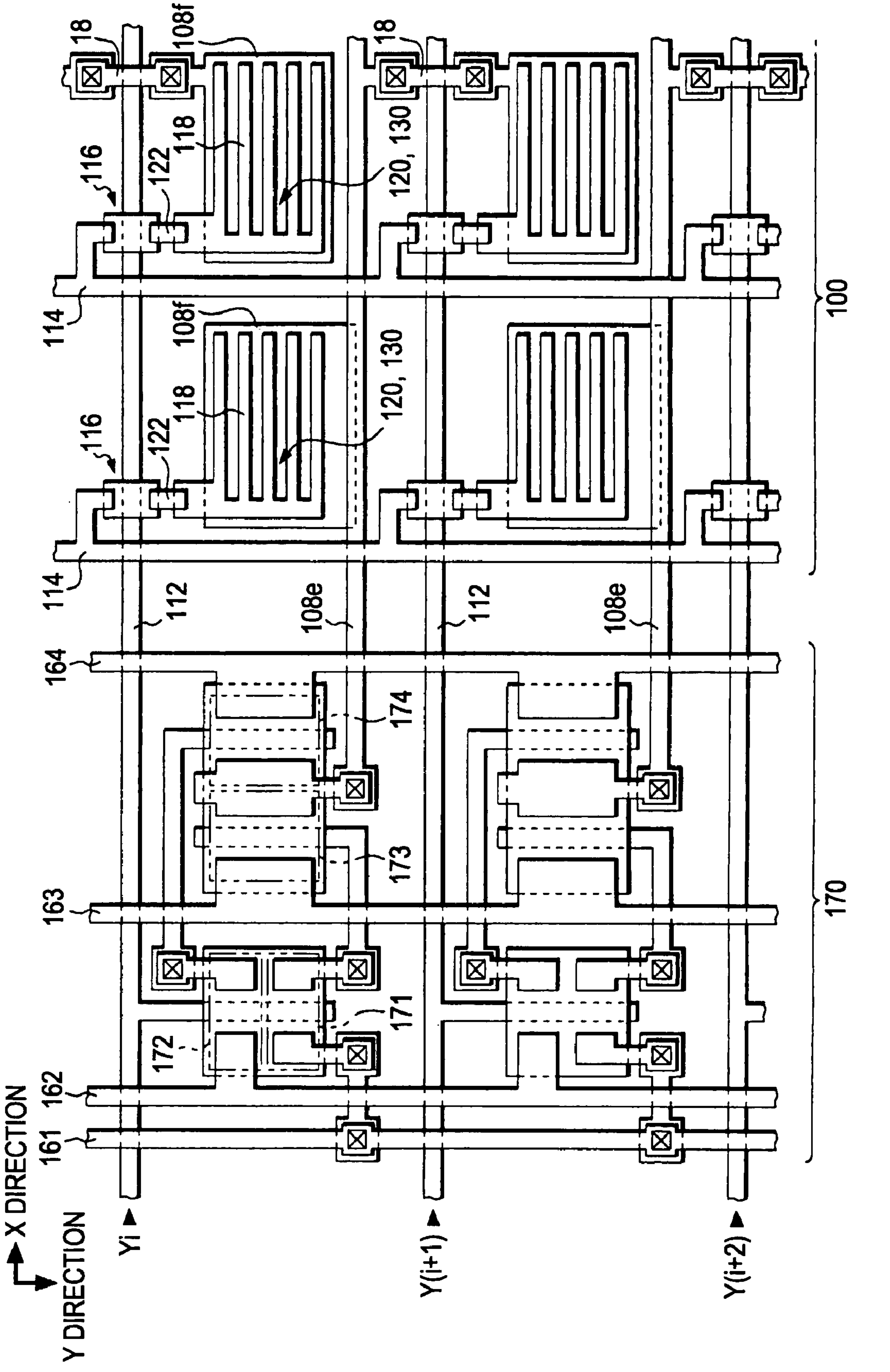
FIG. 13 is a plan view showing a relevant configuration in an element substrate of the electro-optical device.

FIG. 12 is a block diagram showing a configuration of an electro-optical device 10 according to the third embodiment. FIG. 13 is a plan view showing the portions, of the element substrate, around the boundary between the display area 100 and the common electrode driving circuit 170. As shown in these drawings, in the display area 100, for example, in the i-th row, the other ends of the pixel capacitor 120 and storage capacitor 130 of each pixel in the odd-numbered columns are connected to the corresponding i-th common electrode 108, while the other ends of the pixel capacitor 120 and storage capacitor 130 of each pixel in the even-numbered columns are connected to the (i−1)th common electrode 108 that is located above and adjacent to the corresponding row. Specifically, as shown in FIG. 13, the other ends of the pixel capacitor 120 and storage capacitor 130 of each pixel in the even-numbered columns are connected to the common line 108*e* located above and adjacent to the corresponding row so that a corresponding connection electrode 18, which is formed by patterning the fourth conductive layer, passes over the corresponding scanning line 112.

Figure 14:
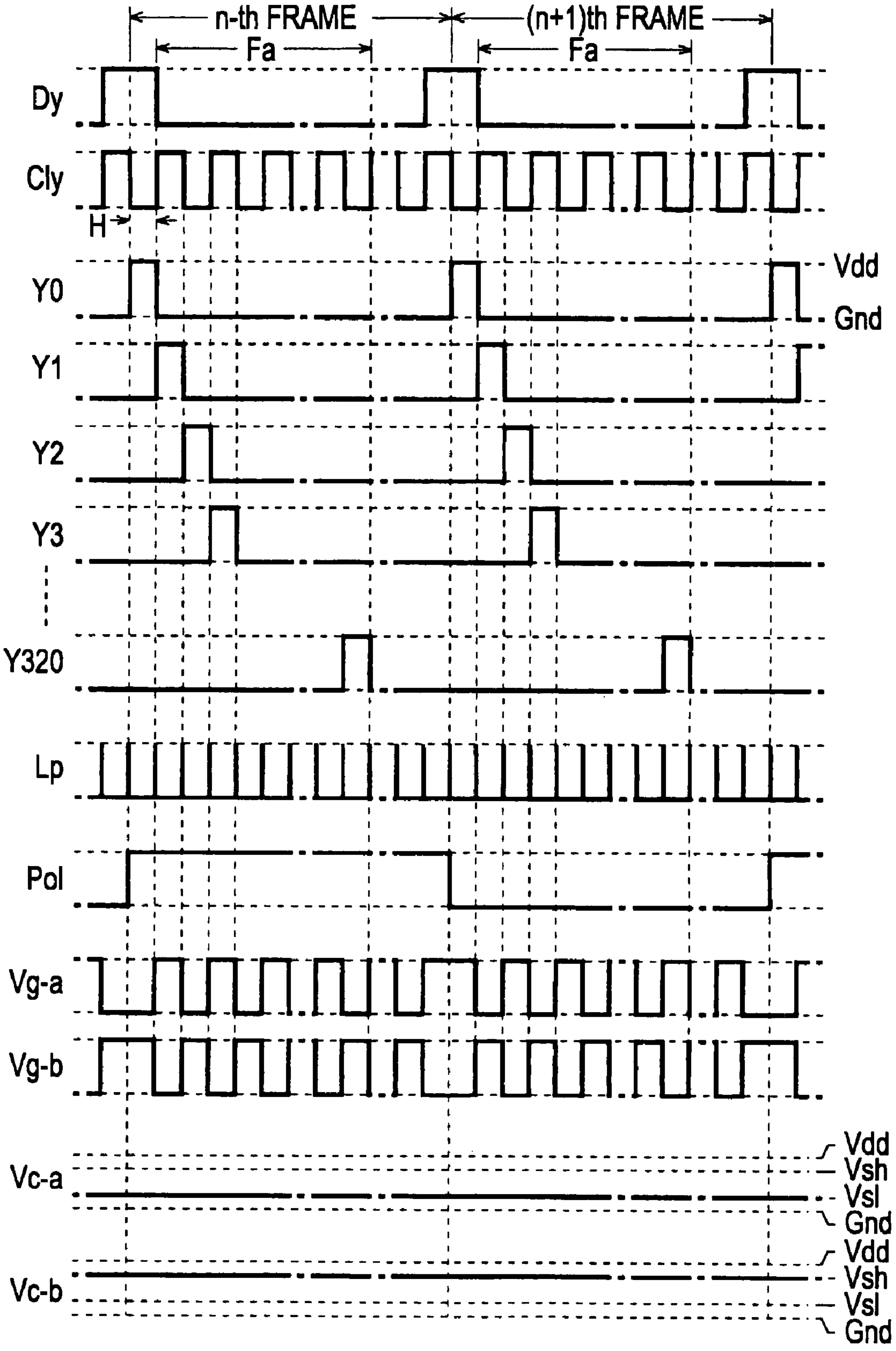
FIG. 14 is a view illustrating the operation of the electro-optical device.

Here, in the first and second embodiments, there is no scanning line above the first scanning line 112. However, in the third embodiment, a zeroth scanning line 112 is provided as a dummy scanning line together with a zeroth common electrode 108. For this reason, the scanning line driving circuit 140 of the third embodiment, as shown in FIG. 14, supplies scanning signals Y0, Y1, Y2, Y3, . . . , Y320 to the corresponding zeroth, first, second, third, 320th scanning lines 112, and sequentially selects the scanning lines 112 line by line in the order of zeroth, first, second, third, . . . , 320th scanning lines. The scanning line driving circuit 140 then sets the scanning signal supplied to the selected scanning line to an H level and sets the scanning signals supplied to the other scanning lines to L levels. In the common electrode driving circuit 170, the TFTs 171 to 174 are provided in correspondence with the zeroth scanning line 112, but, in the display area 100, no pixels 110 are arranged at positions corresponding to the zeroth scanning line 112. Note that the zeroth scanning line 112 shown in FIG. 12 extends over the display area 100, but no pixels 110 are arranged at positions corresponding to this scanning line, so that, as far as the zeroth scanning line 112 is connected to the gate electrodes of the TFTs 171, 172 of the common electrode driving circuit 170, the portion of the zeroth scanning line 112 provided in the display area 100 may be omitted.

In the third embodiment, the polarity specifying signal Pol specifies a writing polarity as in the case of the second embodiment. In addition, the common signals Vc-a, Vc-b shown in FIG. 14 are the same as shown in FIG. 4 of the first embodiment. However, the signals Vg-a, Vg-b are shifted in phase at an angle of 180 degrees relative to the start pulse Dy and the clock signal Cly due to the presence of the scanning signal Y0 but the relationship between the signals Vg-a, Vg-b and the scanning signals Y1 to Y320 when they are at H levels is the same. As described in the first embodiment, in the n-th frame during which the polarity specifying signal Pol is at an H level, each of the odd-numbered common electrodes 108 (1, 3, 5, . . . , 319) is connected to the third power feed line 163 to be applied with the voltage Vsl when the corresponding scanning line 112 is selected and also maintains its connected state even when the selection of the corresponding scanning line 112 is completed. Then, in the (n+1)th frame during which the polarity specifying signal Pol is at an L level after the period of one frame has elapsed, each of the odd-numbered common electrodes 108 is connected to the fourth power feed line 164 to be applied with the voltage Vsh when the corresponding scanning line 112 is selected and also maintains its connected state even when the selection of the corresponding scanning line 112 is completed. On the other hand, in the n-th frame during which the polarity specifying signal Pol is at an H level, each of the even-numbered common electrodes 108 (0, 2, 4, . . . , 320) is connected to the fourth power feed line 164 to be applied with the voltage Vsh when the corresponding scanning line 112 is selected and also maintains its connected state even when the selection of the corresponding scanning line 112 is completed. Then, in the (n+1)th frame during which the polarity specifying signal Pol is at an L level after the period of one frame has elapsed, each of the even-numbered common electrodes 108 is connected to the third power feed line 163 to be applied with the voltage Vsl when the corresponding scanning line 112 is selected and also maintains its connected state even when the selection of the corresponding scanning line 112 is completed.

On the other hand, during a period when the odd-numbered i-th scanning line 112 is selected in the n-th frame, the data line driving circuit 190 outputs data signals of voltages higher than the voltage Vsl by amounts corresponding to the gray-scale levels to the pixels in the odd-numbered columns and outputs data signals of voltages lower than the voltage Vsh by amounts corresponding to the gray-scale levels to the pixels in the even-numbered columns. Since, during a period when the odd-numbered i-th scanning line 112 is selected in the n-th frame, the i-th common electrode 108 is applied with the voltage Vsl and the (i−1)th common electrode 108 located above and adjacent to the i-th common electrode 108 is applied with the voltage Vsh, in the odd-numbered i-th row, the positive polarity writing is executed for each of the pixels 110 in the odd-numbered columns, while the negative polarity writing is executed for each of the pixels 110 in the even-numbered columns. In addition, during a period when the even-numbered (i+1)th scanning line 112 is selected in the n-th frame, the data line driving circuit 190 outputs data signals of voltages lower than the voltage Vsh by amounts corresponding to the gray-scale levels to the pixels in the odd-numbered columns and outputs data signals of voltages higher than the voltage Vsl by amounts corresponding to the gray-scale levels to the pixels in the even-numbered columns. Since, during a period when the even-numbered (i+1)th scanning line 112 is selected in the n-th frame, the (i+1)th common electrode 108 is applied with the voltage Vsh and the i-th common electrode 108 located above and adjacent to the (i+1)th common electrode 108 is applied with the voltage Vsl, in the even-numbered (i+1)th row, the negative polarity writing is executed for each of the pixels 110 in the odd-numbered columns, while the positive polarity writing is executed for each of the pixels 110 in the even-numbered columns.

Note that, in the next (n+1)th frame, the polarity specifying signal Pol is inverted to an L level and the signals Vg-a, Vg-b are logically exchanged, so that the negative polarity writing is executed for each of the odd-numbered i-th row pixels 110 in the odd-numbered columns and the positive polarity writing is executed for each of the odd-numbered i-th row pixels 110 in the even-numbered columns, while the positive polarity writing is executed for each of the even-numbered (i+1)th row pixels 110 in the odd-numbered columns and the negative polarity writing is executed for each of the even-numbered (i+1)th row pixels 110 in the even-numbered columns. Here, the above description is given in the case where the polarity specifying signal Pol, the signals Vg-a, Vg-b and the common signals Vc-a, Vc-b employ the waveforms shown in FIG. 4 but these signals may also employ the waveforms shown in FIG. 6 (but the scanning signal Y0 needs to be added). According to the third embodiment described above, when a dot inversion drive method is employed, only one common electrode 108 is used for each row and, in comparison to the second embodiment, the TFTs 173, 174 each need not be divided into two TFTs. Therefore, it is possible to simplify the configuration by that much.

In the third embodiment, the other ends of the pixel capacitor 120 and storage capacitor 130 in each of the even-numbered columns are connected to the common electrode 108 located above and adjacent to the corresponding row. This is because it uses a difference in voltages between the common electrodes of the mutually adjacent rows. Therefore, in the third embodiment, when the polarity specifying signal Pol, the signals Vg-a, Vg-b, the common signals Vc-a, Vc-b employ the waveforms shown in FIG. 6, the other ends of the pixel capacitor 120 and storage capacitor 130 in each of the even-numbered columns may be connected to the common electrode 108 located below and adjacent to the corresponding row. When the other ends of the pixel capacitor 120 and storage capacitor 130 in each of the even-numbered columns are connected to the common electrode 108 located below and adjacent to the corresponding row, a 321st dummy scanning line is provided together with a 321st common electrode. In addition, in the third embodiment, the other ends of the pixel capacitor 120 and storage capacitor 130 in each of the even-numbered columns are connected to the common electrode 108 located above or below and adjacent to the corresponding row. However, when the attention is paid to the point that the writing polarity specified by the polarity specifying signal Pol is inverted, the other ends of the pixel capacitor 120 and storage capacitor 130 in each of the odd-numbered columns may be connected to the common electrode 108 located above or below and adjacent to the corresponding row.

Figure 15:
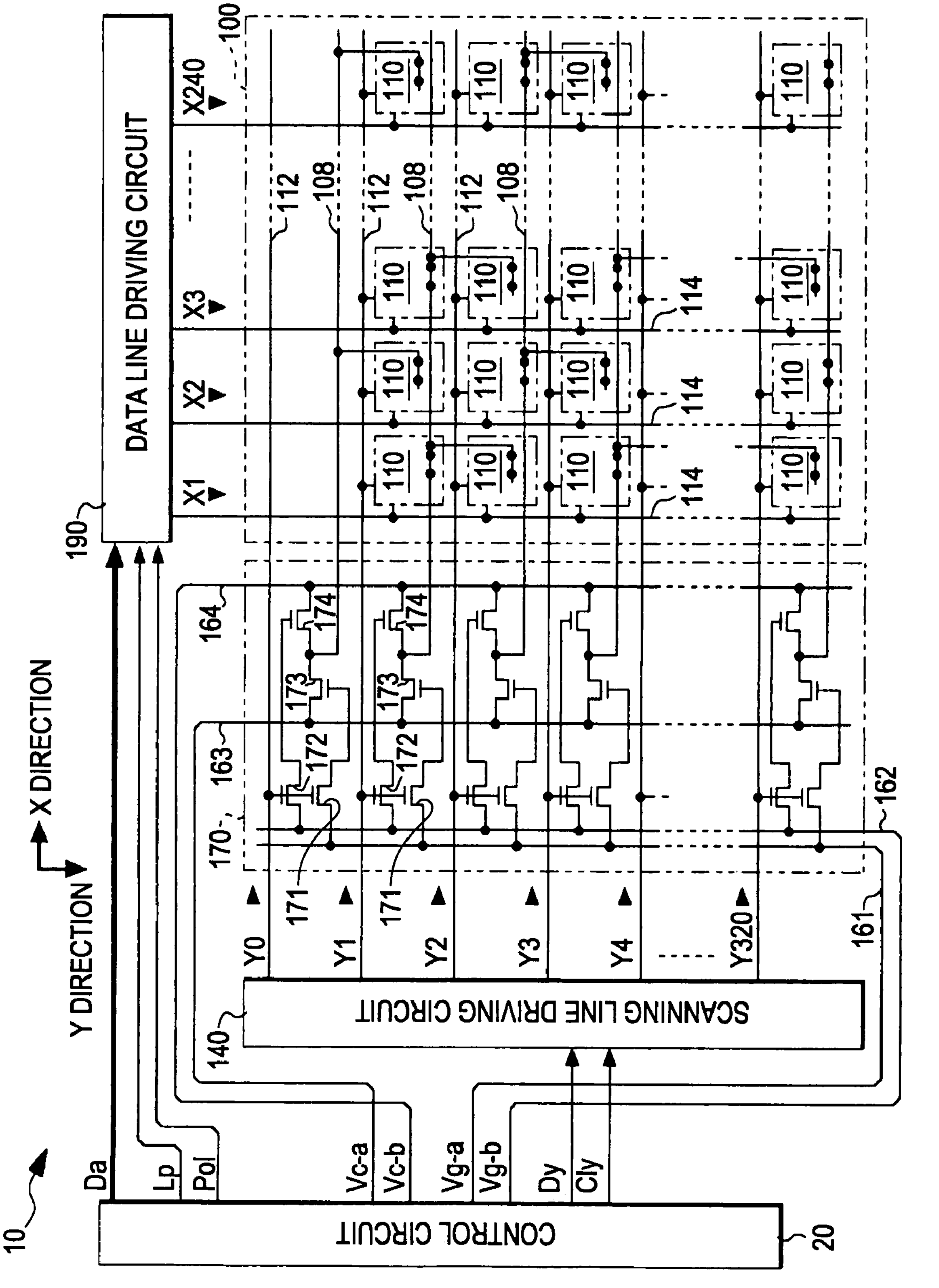
FIG. 15 is a view showing a configuration of an electro-optical device according to an alternative embodiment of the third embodiment.

Other than the configuration in which one of the odd-numbered columns and even-numbered columns are connected to the common electrode 108 located above or below and adjacent to the corresponding row, as shown in FIG. 15, in the display area 100, for example, in the i-th row, the other ends of the pixel capacitor 120 and storage capacitor 130 in each of the odd-numbered columns are connected to the corresponding i-th common electrode 108 and the other ends of the pixel capacitor 120 and storage capacitor 130 in each of the even-numbered columns are connected to the (i−1)th common electrode 108 located above and adjacent to the corresponding row, while, on the other hand, in the adjacent (i+1)th row, the other ends of the pixel capacitor 120 and storage capacitor 130 in each of the odd-numbered columns are connected to the i-th common electrode 108 located above and adjacent to the corresponding row and the other ends of the pixel capacitor 120 and storage capacitor 130 in each of the even-numbered columns are connected to the corresponding (i+1)th common electrode 108, thus it is applicable to alternately exchange common electrodes to which the other ends of the pixel capacitor 120 and storage capacitor 130 are connected every row and column. Note that, in this configuration, as shown in FIG. 16 or FIG. 17, for example, the signals Vg-a, Vg-b need to be fixed at least for a period of one frame and the common signals Vc-a, Vc-b need to be switched from one of the voltages Vsl and Vsh to the other every horizontal scanning period (H).

Here, for example, when the waveforms shown in FIG. 16 are employed, the common signal Vc-a is unnecessary in terms of the operation during a period when the signal Vg-a is at an L level, and the common signal Vc-b is unnecessary during a period when the signal Vg-b is at an L level. Similarly, when the waveforms shown in FIG. 17 are employed, the common signal Vc-b is unnecessary in terms of the operation. Therefore, it is applicable to stop outputting the common signal Vc-a or Vc-b during a period when it is unnecessary in terms of the operation. However, even during a period when it is unnecessary in terms of the operation, when the voltage Vsl or Vsh is selected exclusively to each other as the common signal Vc-a or Vc-b for outputting, switching of voltages applied to the third power feed line 163 and the fourth power feed line 164 is performed simultaneously and in the opposite directions, so that it is possible to reduce a noise accompanied by switching of voltages and also it is possible to reduce a loss of electric power consumed at the parasitic capacitances in both of the power feed lines.

Fourth Embodiment

An electro-optical device according to a fourth embodiment of the invention will now be described. In the above described first embodiment, when the on resistance (impedance) of the TFT 173 or 174 for connecting the third power feed line 163 or the fourth power feed line 164 to the common electrode 108 is large, for example, the i-th common electrode 108 is not able to hold the voltage at the voltage Vsl or Vsh properly. Particularly, when the signals Vg-a, Vg-b and the common signals Vc-a, Vc-b employ the waveforms shown in FIG. 4, as shown in FIG. 5, the i-th common electrode 108 switches its voltage as soon as the i-th scanning line 112 is selected and the scanning signal Yi attains an H level. For this reason, the voltage applied to the i-th common electrode 108 is highly unlikely to converge on either one of the voltages Vsl, Vsh due to the influence of noise, or the like, during a period when the scanning signal Yi is at an H level.

At the timing when the selection of the i-th scanning line 112 is completed (the scanning signal Yi is changed from an H level to an L level), if the voltage of the i-th common electrode 108 is deviated from the voltage Vsl or Vsh, the first to 240th column pixel capacitors 120 in the i-th row would hold voltages that are shifted by that deviation from voltages corresponding to the gray-scale levels. For this reason, there occurs display chrominance non-uniformity in the horizontal direction, causing degradation of display quality. To prevent this problem, the sizes of the TFTs 173, 174 need to be increased so as to decrease the on resistances. When the sizes of the TFTs 173, 174 are increased, an additional area, that is, a so-called display frame area, is required on the outer side of the display area 100 in the configuration in which elements are integrated with an element substrate. However, this display frame area does not contribute to image display and becomes a dead space in light of a display device. Hence, this reduces a yield from one motherboard, thus leading to an increase in costs. Then, in the fourth embodiment, such a degradation of display quality is prevented and no large display frame area is required.

Figure 18:
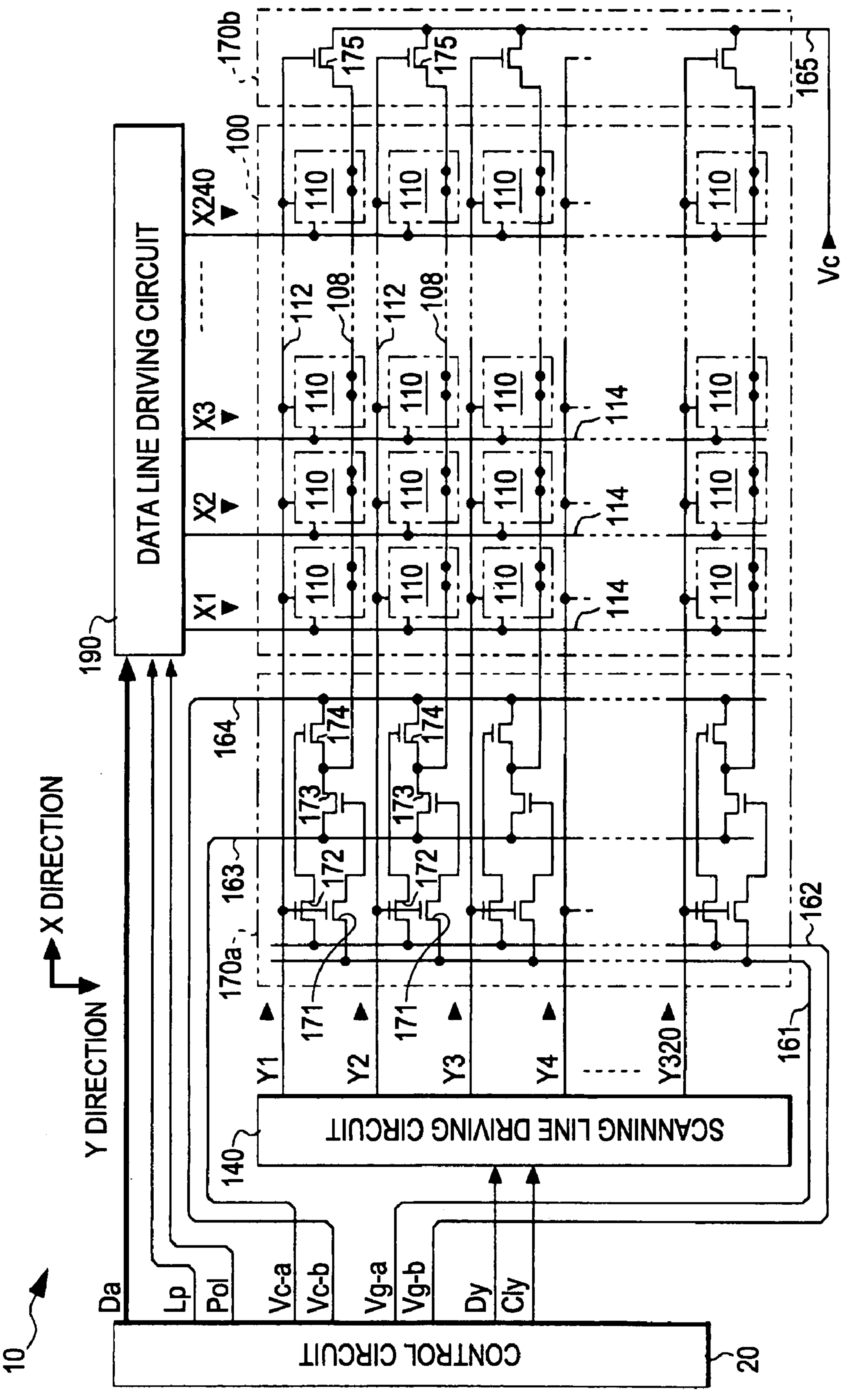
FIG. 18 is a view showing a configuration of an electro-optical device according to a fourth embodiment of the invention.
Figure 20:
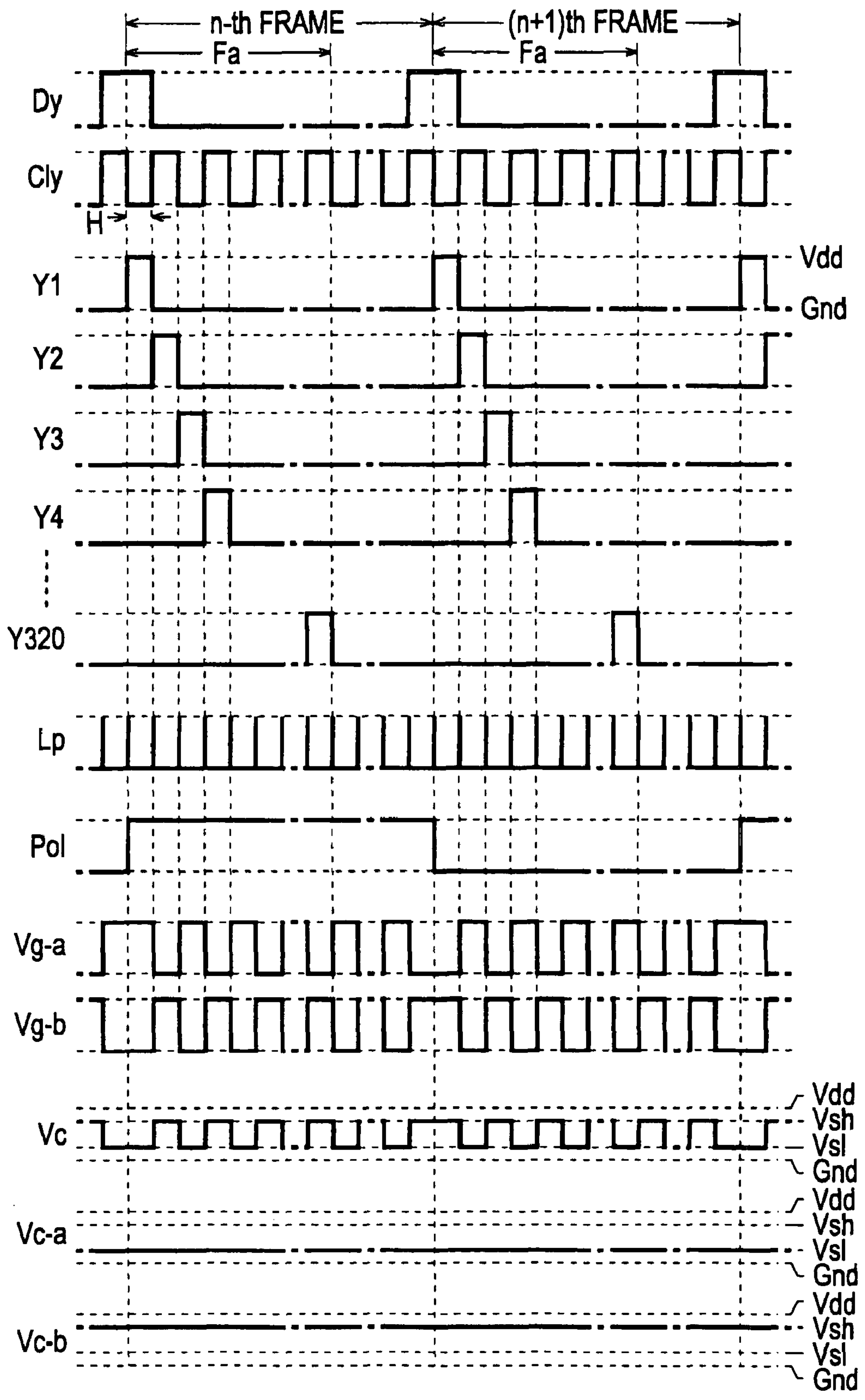
FIG. 20 is a view illustrating the operation of the electro-optical device.

FIG. 18 is a block diagram showing a configuration of an electro-optical device according to the fourth embodiment. As shown in the drawing, in the present embodiment, an n-channel TFT 175 (a fifth transistor) is provided for each row. Specifically, the gate electrode of the i-th row TFT 175 is connected to the i-th scanning line 112, the source electrode thereof is connected to a fifth power feed line 165, and the drain electrode thereof is connected to the i-th common electrode 108. Here, the fifth power feed line 165 is shared by the TFTs 175 in each row, and a common signal Vc is supplied from the control circuit 20 to the fifth power feed line 165. This common signal Vc, when the positive polarity writing is specified for the odd-numbered row pixels 110 and the negative polarity writing is specified for the even-numbered row pixels 110 by the polarity specifying signal Pol, as shown in FIG. 20, becomes the voltage Vsl during a horizontal scanning period (H) when an odd-numbered scanning line is selected and becomes the voltage Vsh during a horizontal scanning period (H) when an even-numbered scanning line is selected, while, on the other hand, the common signal Vc, when the negative polarity writing is specified for the odd-numbered row pixels 110 and the positive polarity writing is specified for the even-numbered row pixels 110 by the polarity specifying signal Pol, becomes the voltage Vsh during a horizontal scanning period (H) when an odd-numbered scanning line is selected and becomes the voltage Vsl during a horizontal scanning period (H) when an even-numbered scanning line is selected.

Figure 19:
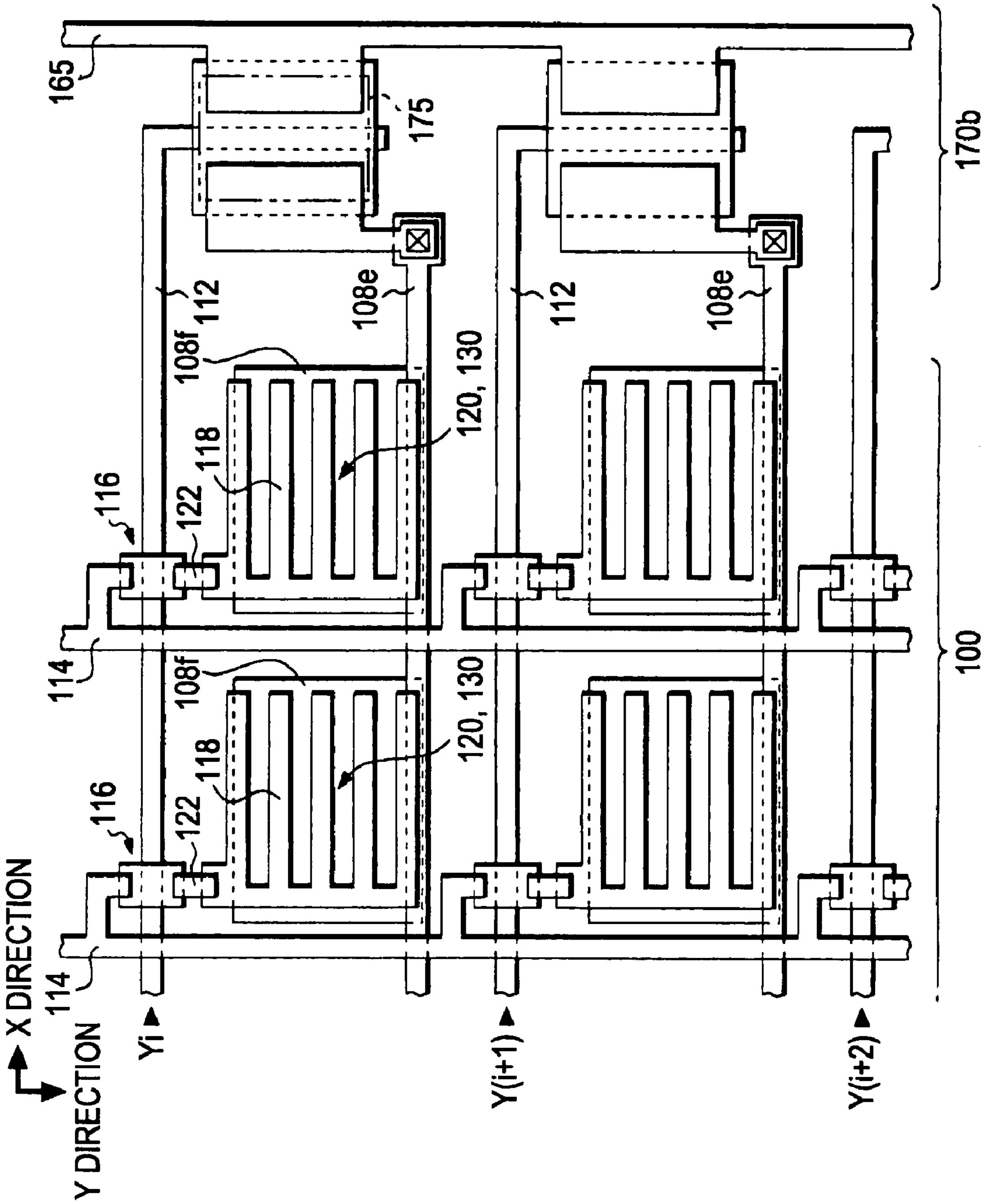
FIG. 19 is a plan view showing a relevant configuration in an element substrate of the electro-optical device.

In this fourth embodiment, the data line driving circuit includes both a circuit 170*a*, which is constituted of the TFTs 171 to 174 in each row, and a circuit 170*b*, which is constituted of the TFT 175 in each row. The circuit 170*a* is provided on one end of the scanning lines 112 and the circuit 170*b* is provided on the other end of the scanning lines 112. FIG. 19 is a plan view showing the portions around the boundary between the display area 100 and the circuit 170*b*, of the element substrate, according to the fourth embodiment. However, it need not be particularly described. Note that the circuit 170*b* may be provided on the one end of the scanning lines 112, as well as the circuit 170*a*.

In this fourth embodiment, for example, when the i-th scanning line 112 is selected and the scanning signal Yi attains an H level, the i-th row TFTs 171, 172 turn on, so that one of the TFTs 173, 174 turns on and the i-th row TFT 175 also turns on. Even when the scanning signal Yi attains an L level after the selection of the i-th scanning line 112 is completed, one of the i-th row TFTs 173, 174 continues to maintain an on state. Thus, as regards the function of determining a voltage of the i-th common electrode 108 during a period when the scanning signal Yi is at an H level, the i-th row TFT 175 works together with the i-th row TFTs 173, 174. On the other hand, as regards the functions of determining a voltage in the i-th common electrode 108 over a period when the scanning signal Yi is at an L level (non-selection period), only the i-th row TFTs 173, 174 work.

Then, in the fourth embodiment, as regards the function of determining a voltage of the i-th common electrode 108 during a period when the scanning signal Yi is at an H level, by intensively using the TFT 175 as compared to the i-th row TFTs 173, 174, it is possible to reduce a required total size of transistors. A description will be given in terms of this point. If no TFT 175 is provided and the sizes of the TFTs 173, 174, each having sufficiently decreased on resistance, are 1.0, it is only necessary for the TFTs 171, 172 to have a function of controlling the on/off states of the TFTs 173, 174. Therefore, the transistor sizes of, for example, around 0.1 are enough. Thus, when no TFT 175 is provided and the TFTs 173, 174 have sufficiently low on resistances, focusing on one row, the TFTs 171, 172, 173, 174 need to have the transistor sizes of 0.1, 0.1, 1.0, 1.0, which amount to 2.2.

In contrast to this, in the fourth embodiment in which the TFT 175 is provided, the TFTs 173, 174 only need to have the transistor sizes of around 0.1 because they are used with the function of determining a voltage applied to the common electrode 108 over the above described non-selection period. The transistor size of 0.9, that is obtained by subtracting 0.1 from 1.0, which is the transistor size for achieving a sufficiently decreased on resistance, is the transistor size required for the TFT 175. For this reason, in the present embodiment, focusing on one row, the TFTs 171, 172, 173, 174, 175 need to have the transistor sizes of 0.1, 0.1, 0.1, 0.1, 0.9, which only amount to 1.3.

Accordingly, in the fourth embodiment, since five TFTs are provided for each row of the common electrode driving circuit 170, only one TFT is increased but it is possible to considerably reduce a required transistor size. For this reason, degradation of display quality is prevented and no large display frame area is required.

Fifth Embodiment

In the fourth embodiment, when the i-th scanning line 112 is selected, the i-th common electrode 108 is applied with the voltage Vsl or Vsh mainly through the fifth power feed line 165 and the i-th row TFT 175. In this configuration as well, the transistor size of the TFT 175 needs to be larger than other TFTs 171 to 174. In addition, the common electrode 108 itself has parasitic capacitances and is capacitively coupled with various portions, so that, at the timing when the selection of the i-th scanning line 112 is completed, the voltage of the i-th common electrode 108 may possibly be still deviated from the voltage Vsl or Vsh. Then, the following fifth embodiment that attempts to reduce the transistor size of the TFT 175 and to further suppress a variation in voltage of the common electrode will be described.

Figure 21:
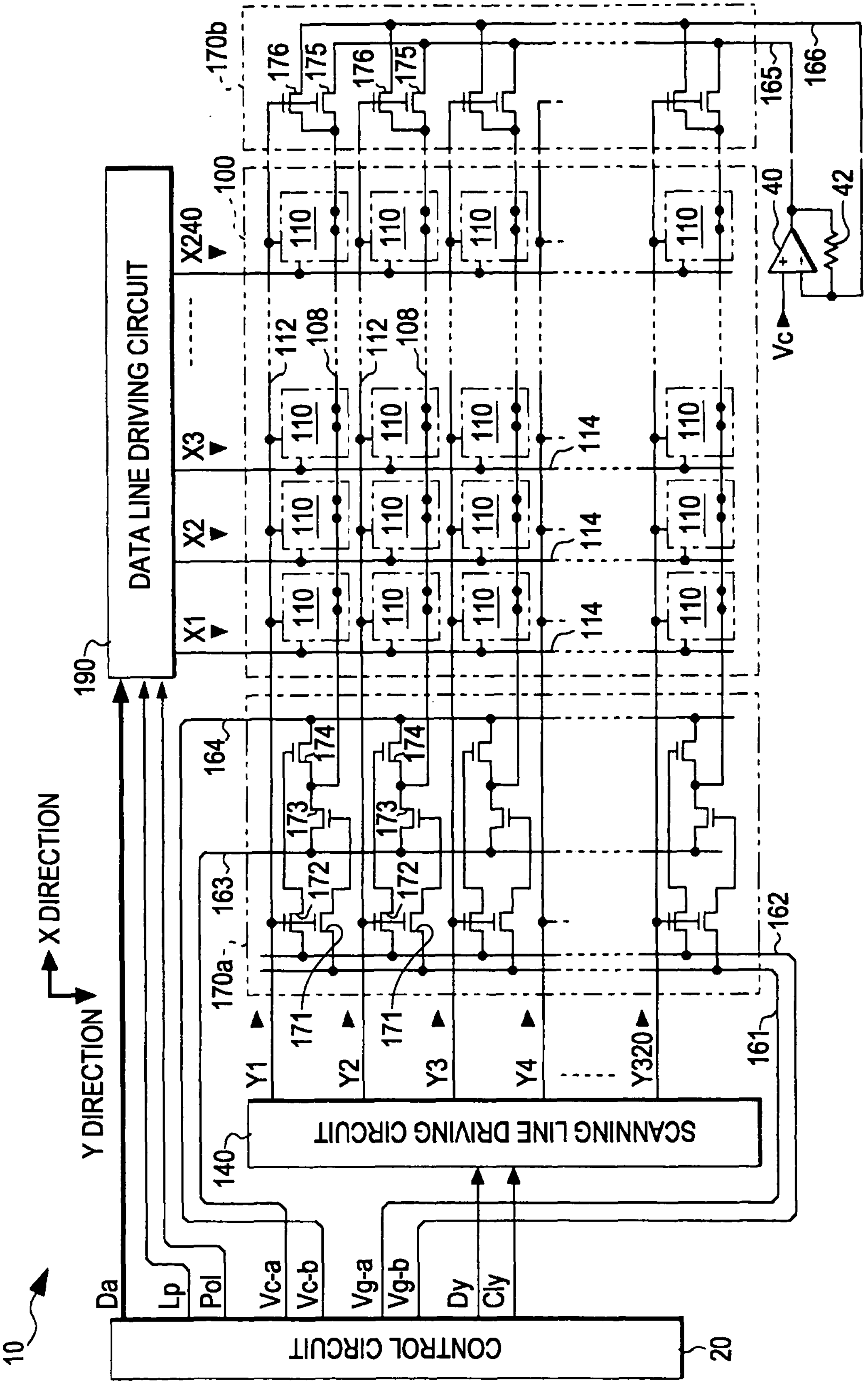
FIG. 21 is a view showing a configuration of an electro-optical device according to a fifth embodiment of the invention.
Figure 22:
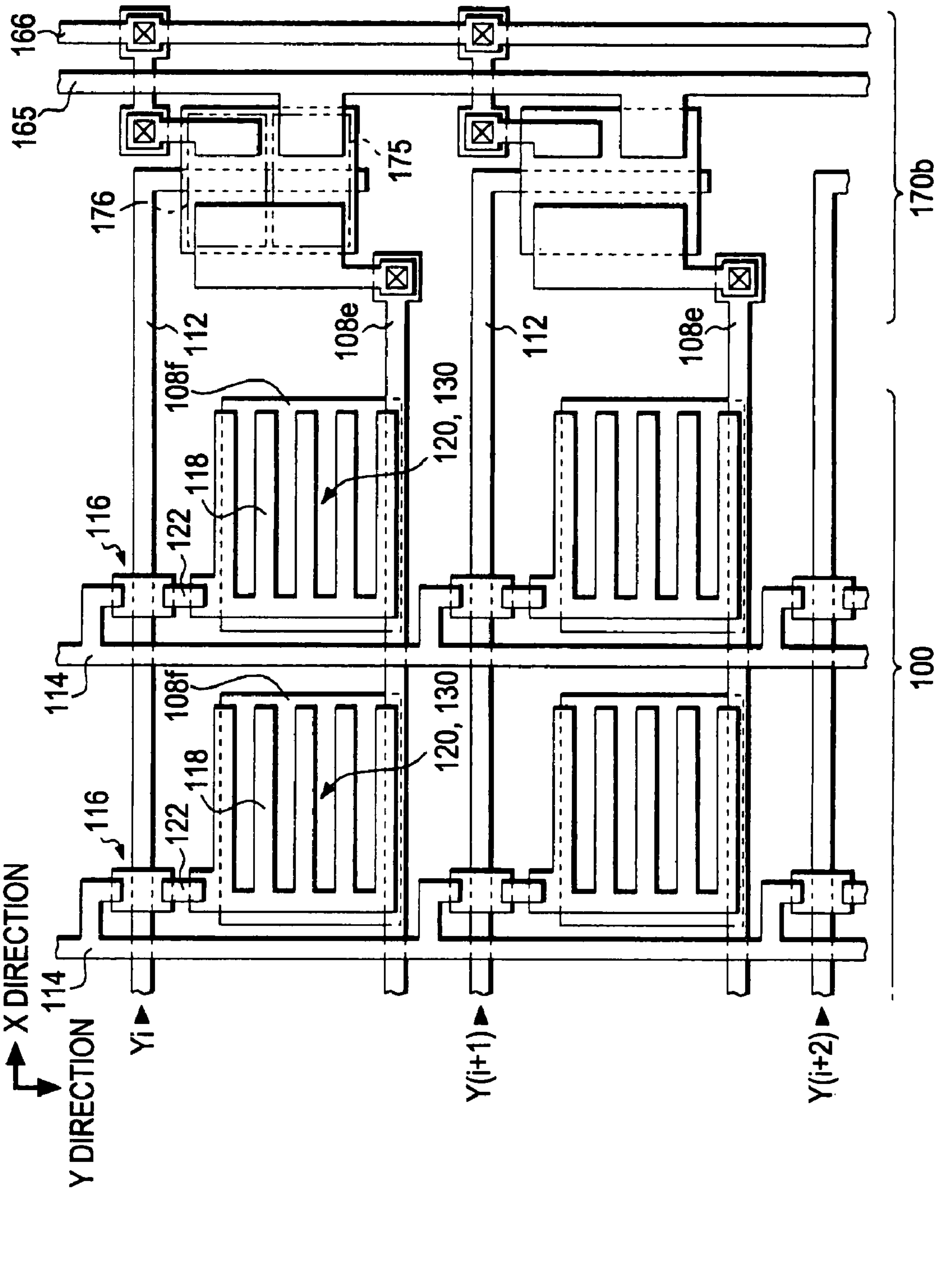
FIG. 22 is a plan view showing a relevant configuration in an element substrate of the electro-optical device.

FIG. 21 is a block diagram showing a configuration of an electro-optical device 10 according to the fifth embodiment. FIG. 22 is a plan view showing the portions around the boundary between the display area 100 and the circuit 170*b*, of the element substrate, according to the fifth embodiment. As shown in the drawing, in the fifth embodiment, an n-channel TFT 176 (a sixth transistor) is provided for each row in addition to the TFT 175. Specifically, the gate electrode of the i-th row TFT 176 is connected to the i-th scanning line 112, the source electrode thereof is connected to the i-th common electrode 108, and the drain electrode thereof is connected to a detection line 166. The detection line 166 is shared by the TFT 176 in each row and is connected to the negative input terminal (−) of an operational amplifier 40. On the other hand, the positive input terminal (+) of the operational amplifier 40 is supplied with the common signal Vc (see FIG. 20) from the control circuit 20. The output terminal of the operational amplifier 40 is connected to the fifth power feed line 165 and is fed back to the negative input terminal (−) through a resistive element 42. Note that the resistance of the resistive element 42 is used for specifying the amount of feedback and, actually, various wiring line resistances need to be considered. However, if these wiring resistances are not considered, the circuit has no resistance. For this reason, the operational amplifier 40 controls a voltage applied to the fifth power feed line 165 so that the voltage of the detection line 166 that is connected to the negative input terminal (−) becomes a voltage of the common signal Vc supplied to the positive input terminal (+).

In the fifth embodiment, for example, when the i-th scanning line 112 is selected and the scanning signal Yi attains an H level, the i-th row TFT 176 turns on together with the i-th row TFT 175, so that the i-th common electrode 108 is connected to the detection line 166. For this reason, when the actual voltage applied to the i-th common electrode 108 is deviated from the voltage Vsl or Vsh, the operational amplifier 40 applies a voltage that is controlled to cancel the deviation to the i-th common electrode 108 through the fifth power feed line 165 and the i-th row TFT 175. Thus, in the present embodiment, for example, even when the on resistance of the i-th row TFT 175 is not low, the i-th common electrode 108 is controlled to be applied with the voltage Vsl or Vsh during a period when the scanning signal Yi is at an H level. Therefore, according to the present embodiment, it is possible to reduce the transistor size of the TFT 175 and to suppress a variation in voltage of the common electrode.

Applications and Alternative Embodiments

In the above described embodiments, the i-th row TFTs 171, 172 are turned on when the i-th scanning line is selected and the scanning signal Yi attains an H level. Here, as regards the on states of the TFTs 171, 172, it is important to determine whichever TFT 173 or 174 is turned on and the other one is turned off by connecting the first power feed line 161 or the second power feed line 162 to the gate electrode of the TFT 173 or 174, but it is not so important when to turn on the TFTs 171, 172. For this reason, as in the first application and alternative embodiment shown in FIG. 23, it is applicable that, in each row of the common electrode driving circuit 170, the gate electrodes of the TFTs 171, 172 are connected not to the corresponding scanning line but to the scanning line 112 located below and adjacent to the corresponding scanning line. In this configuration, following the 320th scanning line, the 321st scanning line 112 is provided as a dummy. For this reason, the scanning line driving circuit 140 supplies the 321st scanning line with a scanning signal Y321 and sequentially selects the scanning lines in the order of first, second, third, . . . , 320th, 321st scanning lines. According to such a configuration, in terms of the layout of elements, the area of display frame required for forming the common electrode driving circuit 170 may possibly be reduced. Note that, though not particularly shown in the drawing, the gate electrodes of the TFTs 171, 172 may be connected to the scanning line 112 located above and adjacent to the corresponding scanning line or may be connected to the scanning line located a predetermined number of scanning lines, such as 2, 3, or more number of scanning lines, away from the corresponding scanning line. However, the configuration, in which the gate electrodes of the TFTs 171, 172 are connected to the scanning line located a certain number of scanning lines away from the corresponding scanning line, needs to pass over numbers of intervening scanning lines, so that wirings become complex and numbers of contact holes need to be formed. Therefore, it is actually not desirable that the configuration, in which the gate electrodes of the TFTs 171, 172 are connected to the scanning line located remote from the corresponding scanning line.

Figure 23:
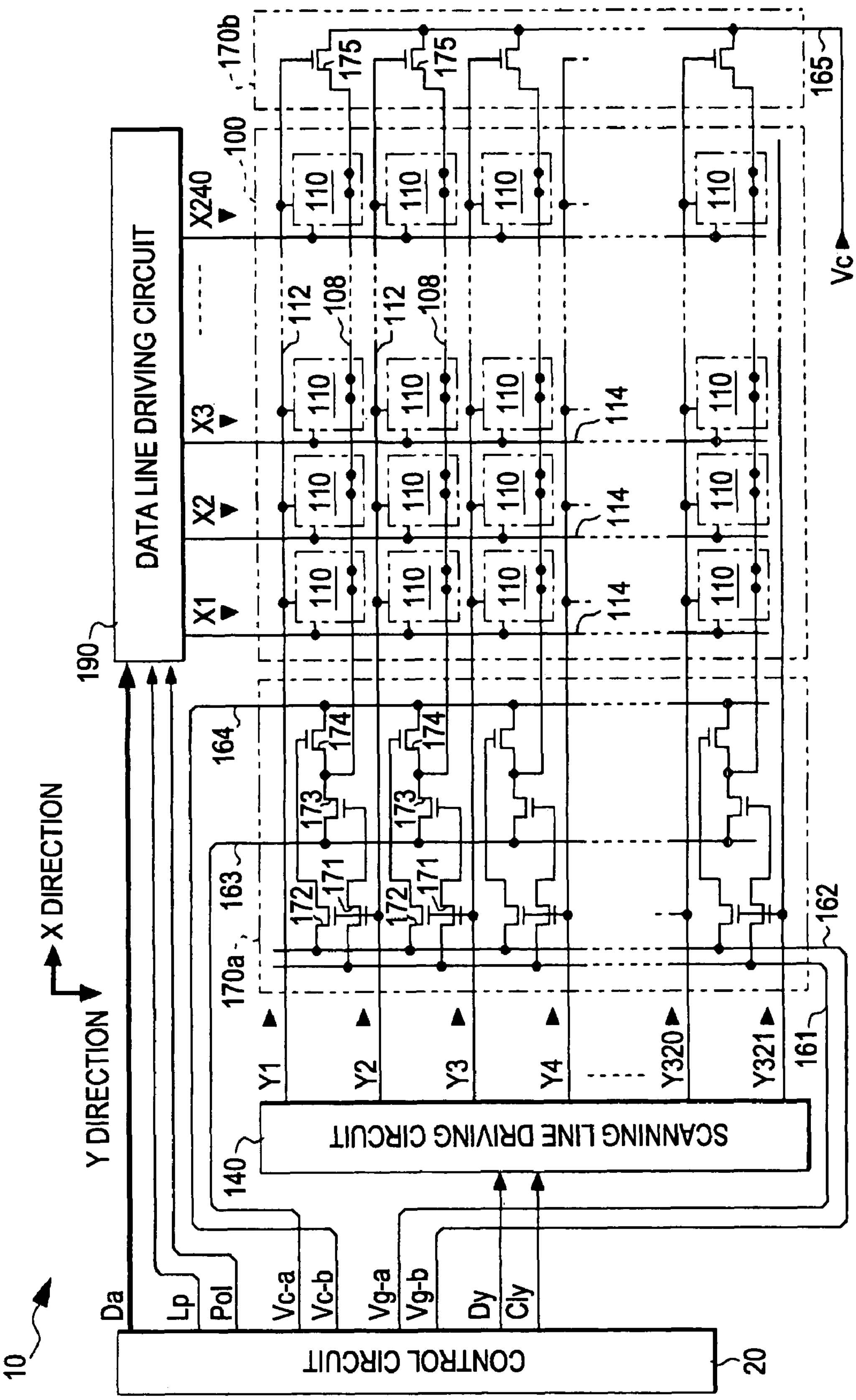
FIG. 23 is a view showing a configuration of an electro-optical device according to a first application/alternative embodiment of the invention.

Here, when the gate electrodes of the TFTs 171, 172 are connected not to the corresponding scanning line but to another scanning line 112 in each row of the common electrode driving circuit 170, because it is not desirable that the voltage of the common electrode 108 is deviated from the voltage Vsl or Vsh during a period when the corresponding scanning line is selected, it is preferable that the TFT 175 is provided for each row of the common electrode driving circuit 170 and the common electrode driving circuit 170 is divided into the circuits 170*a*, 170*b*, as shown in FIG. 23. Note that the circuit 170*b* of the configuration shown in FIG. 23 corresponds to the configuration shown in FIG. 18.

Figure 24:
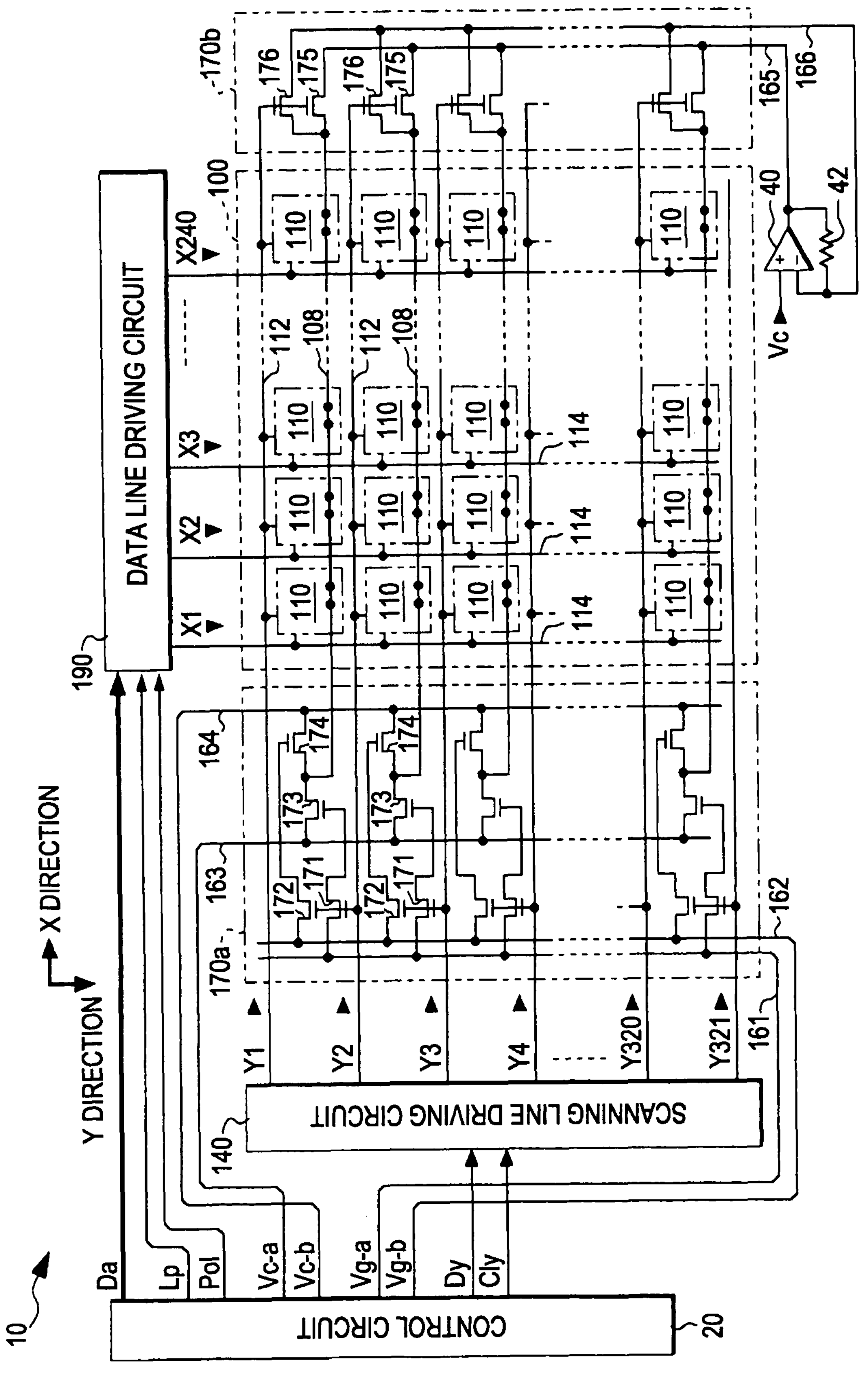
FIG. 24 is a view showing a configuration of an electro-optical device according to a second application/alternative embodiment of the invention.

Further, as in the second application and alternative embodiment shown in FIG. 24, it is applicable that, by providing the TFT 176 for each row of the common electrode driving circuit 170 together with the TFT 175, the transistor size of the TFT 175 is reduced and a variation in voltage of the common electrode is suppressed. Note that the circuit 170*b* of the configuration shown in FIG. 24 corresponds to the configuration shown in FIG. 21.

Here, in the configuration in which the TFT 175 (176) is provided, as described above, the i-th row TFT 175 has a function of determining a voltage of the i-th common electrode 108 during a period when the scanning signal Yi is at an H level. Therefore, a configuration in which the i-th row TFTs 173, 174 are turned off during a period when the scanning signal Yi is at an H level is applicable. As an example, as in the third application and alternative embodiment shown in FIG. 25, n-channel TFTs 177, 178 may be provided in each row of the circuit 170*a* in the common electrode driving circuit 170 in addition to the TFTs 171 through 174. Specifically, the gate electrodes of the i-th row TFTs 171, 172 are connected to the next (i+1)th scanning line 112. Further, the gate electrode of the i-th row TFT 177 (a seventh transistor) is connected to the i-th scanning line 112, the source electrode thereof is connected to a power feed line 167 (an off voltage power feed line), and the drain electrode thereof is connected to the gate electrode of the i-th row TFT 173. Similarly, the gate electrode of the i-th row TFT 178 (an eighth transistor) is connected to the i-th scanning line 112, the source electrode thereof is connected to the power feed line 167, and the drain electrode thereof is connected to the gate electrode of the i-th row TFT 174. Here, the power feed line 167 is supplied with a logical L level as a signal Voff.

In such a configuration, focusing on the i-th row of the common electrode driving circuit 170, when the i-th scanning line 112 is selected and the scanning signal Yi attains an H level, the i-th row TFTs 177, 178 turn on, so that the gate electrodes of the i-th row TFTs 173, 174 are connected to the power feed line 167. For this reason, the i-th row TFTs 173, 174 each become an off state, and a voltage charged in the parasitic capacitance of the gate electrode is reset to zero. When the next (i+1)th scanning line is selected and the scanning signal Y(i+1) attains an H level, the i-th row TFTs 171, 172 turn on in the common electrode driving circuit 170, so that the gate electrodes of the i-th row TFTs 173, 174 are exclusively applied with an H level or an L level and is held by the associated parasitic capacitances. Accordingly, even when the scanning signal Y(i+1) attains an L level, the on/off states of the TFTs 173, 174 are maintained until the i-th scanning line 112 is selected again and the scanning signal Yi then attains an H level.

Thus, in the circuit 170*a* of the common electrode driving circuit 170, focusing on the i-th row, the TFTs 173, 174 each turn off during a period when the scanning signal Yi is at an H level, so that th i-th common electrode 108 is not connected to the third power feed line 163 or the fourth power feed line 164. However, in the circuit 170*b* of the common electrode driving circuit 170, focusing on the i-th row, the TFT 175 (176) is turned on during a period when the scanning signal Yi is at an H level, and the i-th common electrode 108 is applied with either one of the voltages Vsl, Vsh corresponding to the writing polarity. For this reason, consequently, the i-th common electrode 108 does not enter a voltage indeterminate state.

In this third application and alternative embodiment, in the circuit 170*a* of the common electrode driving circuit 170, for example, during a period when the scanning signal Yi is at an H level, the operation is not performed to determine a voltage of the i-th common electrode 108. Therefore, a variation in voltage when the i-th scanning line 112 is selected is hardly applied to other rows, so that the influence on each common electrode 108 is reduced and high display quality is achieved by that much. Note that, in the third application and alternative embodiment shown in FIG. 25, the TFT 176 is provided in correspondence with each row and, during a selection period, a voltage of the common electrode 108 corresponding to the selected scanning line is feedback controlled by the operational amplifier 40. However, a configuration with no feedback control (the circuit 170*b* shown in FIG. 18) may be employed.

Figure 25:
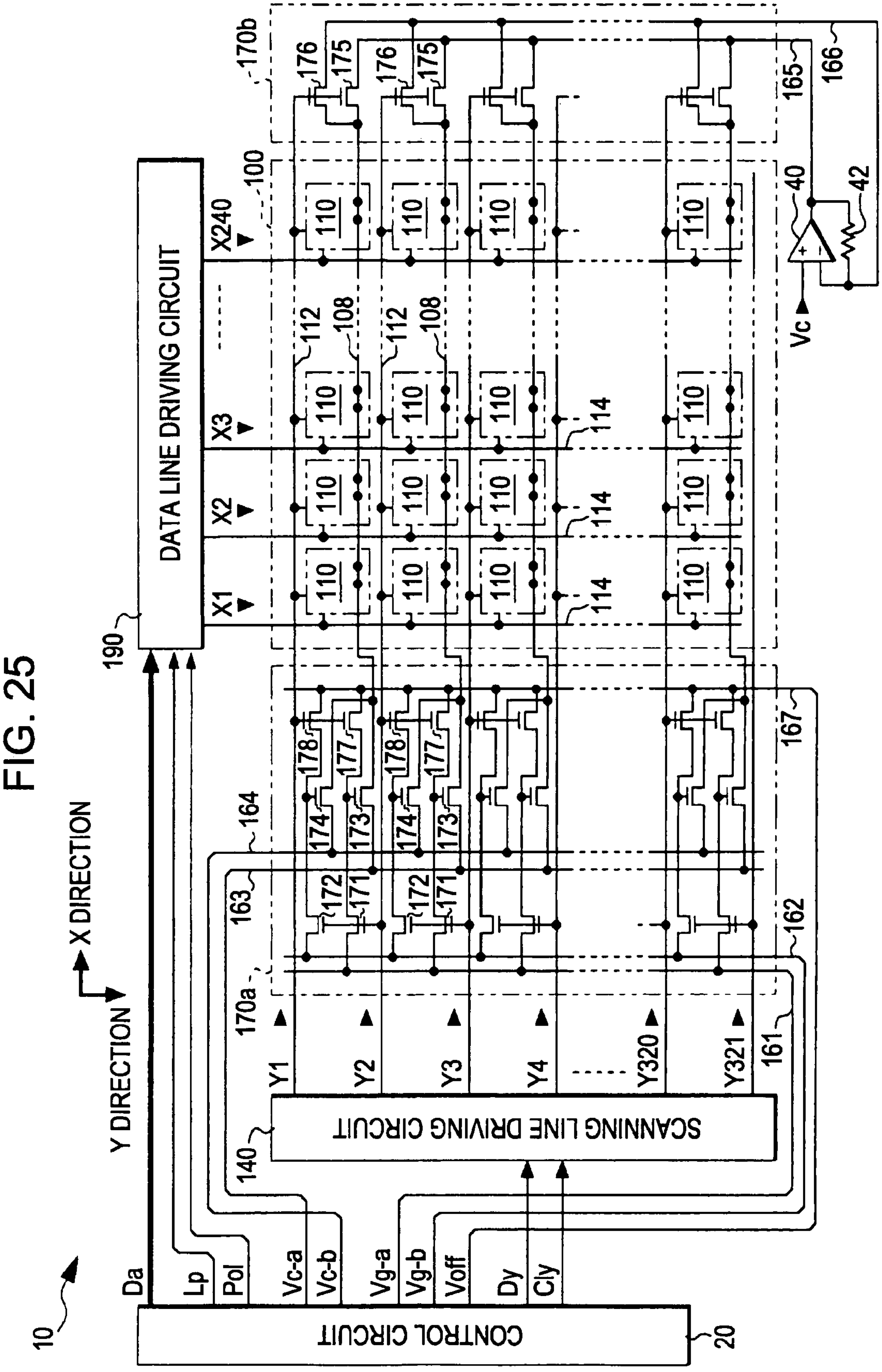
FIG. 25 is a view showing a configuration of an electro-optical device according to a third application/alternative embodiment of the invention.
Figure 26:
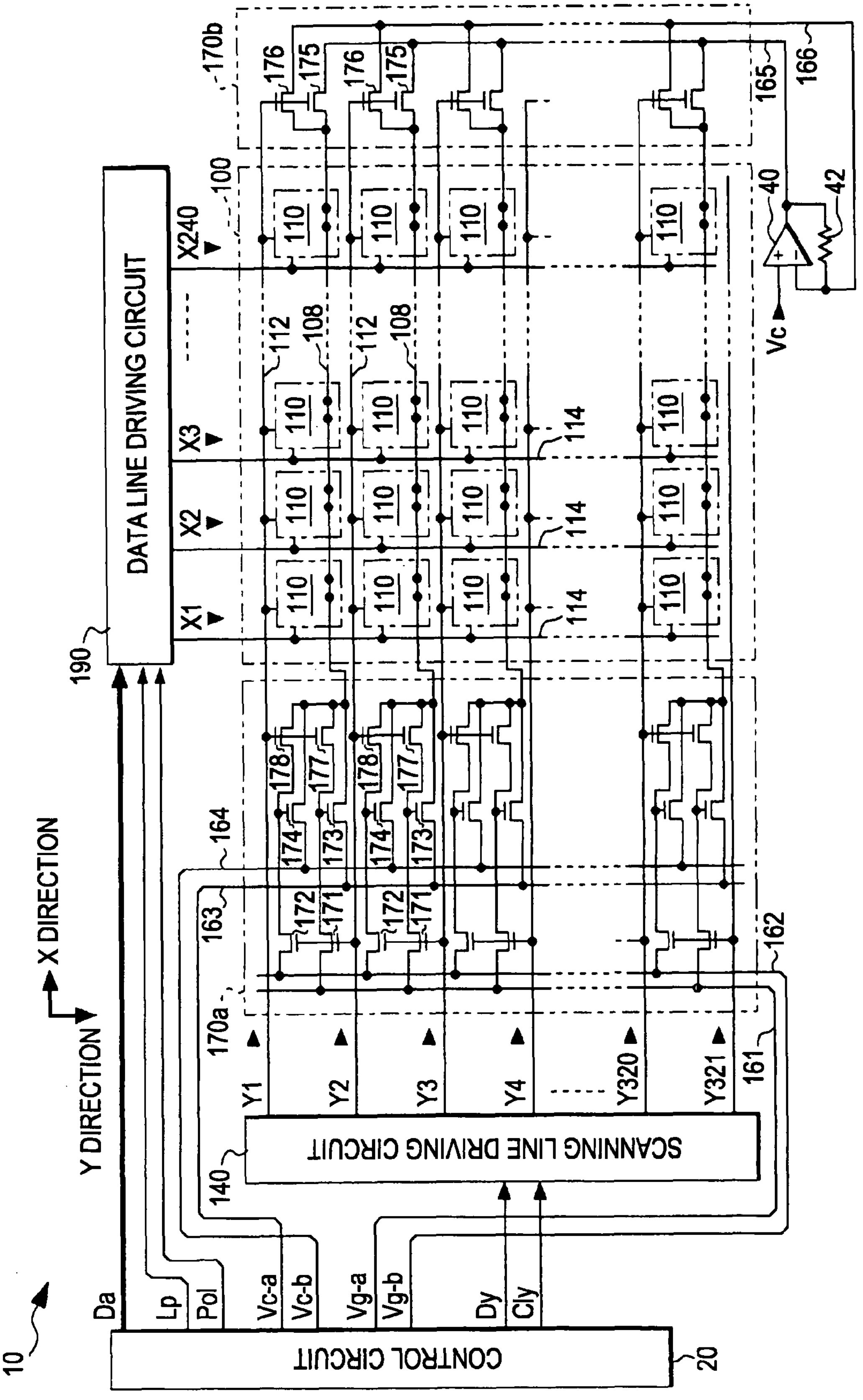
FIG. 26 is a view showing a configuration of an electro-optical device according to a fourth application/alternative embodiment of the invention.

In addition, in the third application and alternative embodiment shown in FIG. 25, the off voltages of the TFTs 173, 174 in each row are supplied through the power feed line 167. However, as in the fourth application and alternative embodiment shown in FIG. 26, for example, the source electrodes of the i-th row TFTs 177, 178 each may be connected to the i-th common electrode 108. Here, the i-th common electrode 108 is applied with either one of the voltage Vsl or the voltage Vsh corresponding to the writing polarity. Where the voltage that turn on the TFTs 173, 174 is Von, and the voltages Vsl, Vsh have a relationship as (Gnd≦) Vsl<Vsh<Von (≦Vdd), the voltages Vsl, Vsh may be used as off voltages. For this reason, according to the fourth application and alternative embodiment shown in FIG. 26, because the power feed line 167 need not be provided, it is possible to achieve simplification of configuration by that much. Note that, in the fourth application and alternative embodiment shown in FIG. 26 as well, the configuration in which a feedback control is not performed by the operational amplifier 40 (the circuit 170*b* shown in FIG. 18) may be employed.

Note that, in the above described scanning line driving circuit 140, the scanning lines 112 are sequentially selected in the order of (zeroth), first, second, third, . . . , 320th, (321st) scanning lines. However, the selection may be made oppositely in the order of (321st), 320th, 319th, 318th, . . . , first, (zeroth) scanning lines. In addition, because it is nonsense to specify a writing polarity during a vertical fly-back period, the logical signals, such as the polarity specifying signal Pol or the common signals Vc-a, Vc-b, may be fixed at a certain level. Further, in the embodiments, each of the pixel capacitors 120 is set as a normally white mode. However, a normally black mode in which a dark state is performed in a state where no voltage is applied may be used for each of the pixel capacitors 120. Moreover, it is applicable that a color display is performed by forming each dot with three pixels R (red), G (green), B (blue). It is also applicable that an additional color (for example, cyan (C)) is used and a color reproducibility is improved by forming each dot with these four color pixels.

Electronic Apparatus

Figure 27:
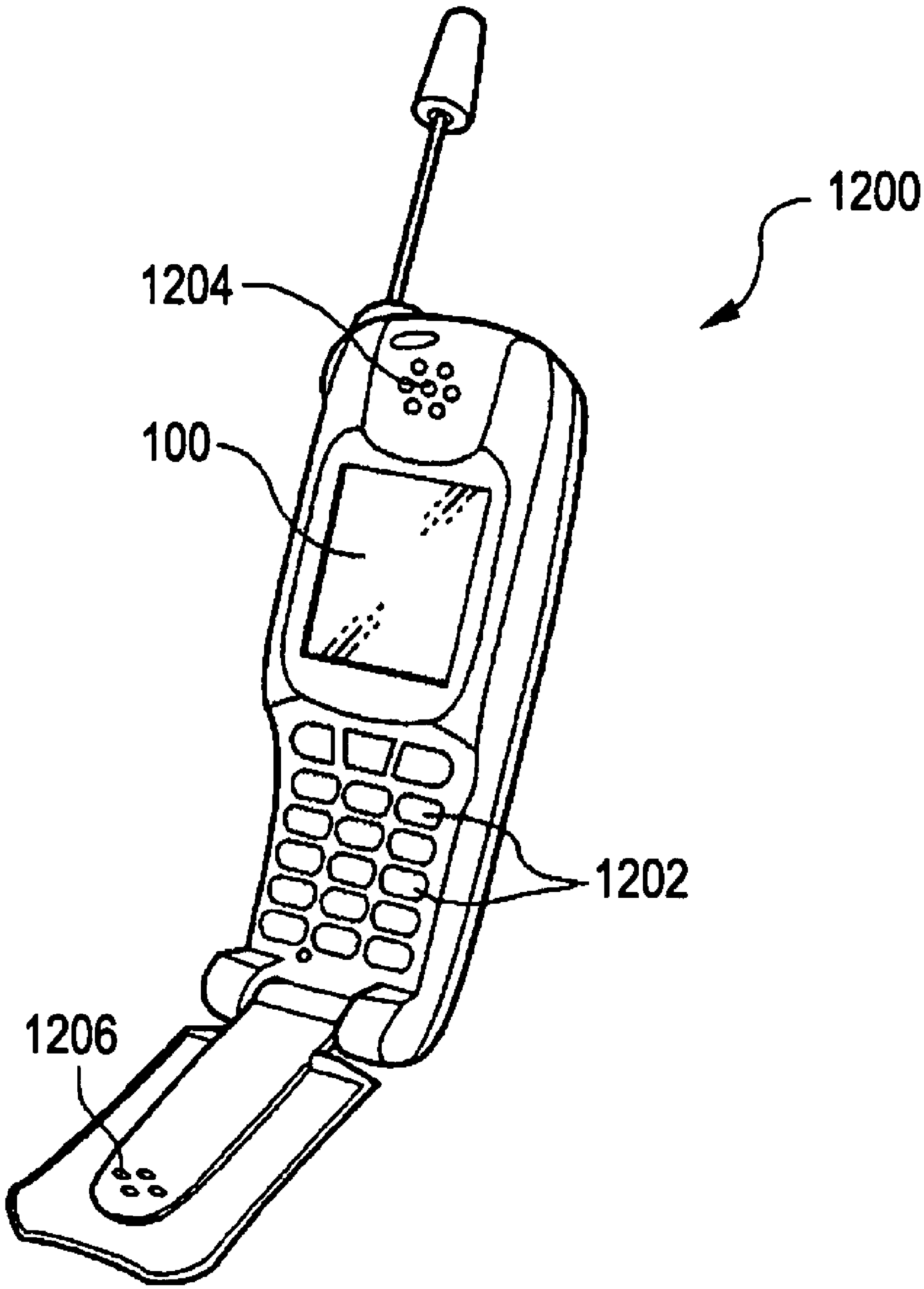
FIG. 27 is a view showing a mobile telephone that employs the electro-optical device according to the embodiments.

An example of an electronic apparatus having the electro-optical device 10 according to the above described embodiments as a display device will now be described. FIG. 27 is a view showing a configuration of a mobile telephone 1200 that employs the electro-optical device 10 according to any one of the embodiments described above. As shown in the drawing, the mobile telephone 1200 includes a plurality of operation buttons 1202, an ear piece 1204, a mouth piece 1206, and the above described electro-optical device 10.

Note that electronic apparatuses to which the electro-optical device 10 is applied include, in addition to the mobile telephone shown in FIG. 27, a digital still camera, a laptop computer, a liquid crystal display television, a video recorder, a car navigation system, a pager, an electronic organizer, an electronic calculator, a word processor, a workstation, a video telephone, a POS terminal, and a device provided with a touch panel. Needless to say, the above electro-optical device 10 is applicable to these various electronic apparatuses as a display device.

The entire disclosure of Japanese Patent Application No. 2006-299943, filed Nov. 6, 2006 is expressly incorporated by reference herein.

What is claimed is:

1. A driving circuit comprising: a plurality of scanning lines;

a plurality of data lines;

a plurality of common electrodes provided in correspondence with the plurality of scanning lines;

pixels arranged at positions corresponding to intersections of the plurality of scanning lines and the plurality of data lines, wherein each of the pixels includes:

a pixel switching element, one end of which is connected to a corresponding one of the data lines, wherein the pixel switching element enters an electrical conductive state when a corresponding one of the scanning lines is selected; and a pixel capacitor, one end of which is connected to an end of the pixel switching element, which is not connected to the data line, and the other end of the pixel capacitor, which is not connected to the pixel switching element, is connected to the common electrode, and wherein each of the pixels emits light with a gray-scale level corresponding to a voltage held by the corresponding pixel capacitor;

a scanning line driving circuit that sequentially selects the scanning lines in a predetermined order;

a common electrode driving circuit that separately drives the plurality of common electrodes; and a data line driving circuit that supplies the pixels, corresponding to the selected scanning line, with data signals of voltages corresponding to gray-scale levels of the pixels through the data lines, wherein when one of odd-numbered scanning lines or a scanning line located a predetermined number of scanning lines away from the one of the odd-numbered scanning lines is selected, the common electrode driving circuit applies one of a low level voltage and a high level voltage to the common electrode corresponding to the one of the odd-numbered scanning lines, and, after the selection of the one of the odd-numbered scanning lines is completed or after the selection of the scanning line located a predetermined number of scanning lines away from the one of the odd-numbered scanning lines is completed, the common electrode driving circuit maintains the common electrode corresponding to the one of the odd-numbered scanning line at the one of the low level voltage and the high level voltage, and wherein when one of even-numbered scanning lines or a scanning line located a predetermined number of scanning lines away from the one of the even-numbered scanning lines is selected, the common electrode driving circuit applies the other of the low level voltage and the high level voltage to the common electrode corresponding to the one of the even-numbered scanning lines, and, after the selection of the one of the even-numbered scanning lines is completed or after the selection of the scanning line located a predetermined number of scanning lines away from the one of the even-numbered scanning lines is completed, the common electrode driving circuit maintains the common electrode corresponding to the one of the even-numbered scanning lines at the other of the low level voltage and the high level voltage, wherein the common electrode driving circuit includes first to fourth transistors provided in correspondence with each of the common electrodes, wherein a gate electrode of each first transistor of the first transistors is connected to a corresponding one of the scanning lines or a scanning line located a predetermined number of scanning lines away from the corresponding one of the scanning lines and a source electrode of each first transistor is connected to a first power feed line that is supplied with a voltage with which the third transistor enters one of an on state and an off state, wherein a gate electrode of each second transistor of the second transistors is connected to a corresponding one of the scanning lines or a scanning line located a predetermined number of scanning lines away from the corresponding one of the scanning lines and a source electrode of each second transistor is connected to a second power feed line that is supplied with a voltage with which the fourth transistor enters the other of an on state and an off state, wherein a gate electrode of each third transistor of the third transistors is connected to a drain electrode of a corresponding one of the first transistors and a source electrode of each third transistor is connected to a third power feed line that is supplied with one of a low level voltage and a high level voltage, wherein a gate electrode of each fourth transistor of the fourth transistors is connected to a drain electrode of a corresponding one of the second transistors and a source electrode of each fourth transistor is connected to a fourth power feed line that is supplied with the other of a low level voltage and a high level voltage, and wherein a drain electrode of each third transistor and a drain electrode of each fourth transistor are commonly connected to the corresponding common electrode.

2. The driving circuit for an electro-optical device, according to claim 1, wherein the first power feed line is supplied with a voltage with which the third transistor enters an on state or an off state, the voltage being inverted every time a scanning line is selected, wherein the third power feed line is supplied with one of the low level voltage and the high level voltage at least over a period of one frame, and wherein the fourth power feed line is supplied with the high level voltage when the third power feed line is supplied with the low level voltage, and the fourth power feed line is supplied with the low level voltage when the third power feed line is supplied with the high level voltage.

3. The driving circuit for an electro-optical device, according to claim 1, wherein the first power feed line is supplied with a voltage with which the third transistor enters an on state or an off state at least over a period of one frame, wherein the third power feed line is supplied with the low level voltage or the high level voltage which is inverted every time a scanning line is selected, and wherein the fourth power feed line is supplied with the high level voltage when the third power feed line is supplied with the low level voltage, and the fourth power feed line is supplied with the low level voltage when the third power feed line is supplied with the high level voltage.

4. The driving circuit for an electro-optical device, according to claim 1, wherein the common electrode driving circuit further includes a fifth transistor provided in correspondence with each of the common electrodes, wherein a gate electrode of each fifth transistor of the fifth transistors is connected to a corresponding one of the scanning lines, a source electrode of each fifth transistor is connected to a fifth power feed line that is supplied with a voltage applied to a corresponding one of the common electrodes, and a drain electrode of each fifth transistor is connected to the corresponding common electrode.

5. The driving circuit for an electro-optical device, according to claim 4, wherein the common electrode driving circuit further includes a sixth transistor provided in correspondence with each of the common electrodes, wherein a gate electrode of each sixth transistor of the sixth transistors is connected to a corresponding one of the scanning lines, a source electrode of each sixth transistor is connected to a corresponding one of the common electrodes, and a drain electrode of each sixth transistor is connected to a detection line, and wherein the fifth power feed line is supplied with a signal that is controlled so that a voltage of the detection line becomes one of the low level voltage and the high level voltage.

6. The driving circuit for an electro-optical device, according to claim 1, wherein the common electrode driving circuit further includes seventh and eighth transistors provided in correspondence with each of the common electrodes, wherein a gate electrode of each seventh transistor of the seventh transistors is connected to a corresponding one of the scanning lines, a source electrode of each seventh transistor is supplied with an off voltage with which the third and fourth transistors enter off states, and a drain electrode of each seventh transistor is connected to the gate electrode of the corresponding third transistor, wherein a gate electrode of each eighth transistor of the eighth transistors is connected to a corresponding one of the scanning lines, a source electrode of each eighth transistor is supplied with the off voltage, and a drain electrode of each eighth transistor is connected to the gate electrode of the corresponding fourth transistor.

7. The driving circuit for an electro-optical device, according to claim 6, wherein the drain electrode of each seventh transistor and the drain electrode of each eighth transistor are connected to the corresponding common electrode.

8. An electro-optical device, comprising:

a plurality of scanning lines; a plurality of data lines;

a plurality of common electrodes provided in correspondence with the plurality of scanning lines;

pixels arranged at positions corresponding to intersections of the plurality of scanning lines and the plurality of data lines, wherein each of the pixels includes:

a pixel switching element, one end of which is connected to a corresponding one of the data lines, wherein the pixel switching element enters an electrical conductive state when a corresponding one of the scanning lines is selected; and a pixel capacitor, one end of which is connected to an end of the pixel switching element, which is not connected to the data line, and the other end of the pixel capacitor, which is not connected to the pixel switching element, is connected to the common electrode, and wherein each of the pixels emits light with a gray-scale level corresponding to a voltage held by the corresponding pixel capacitor;

a scanning line driving circuit that sequentially selects the scanning lines in a predetermined order;

a common electrode driving circuit that separately drives the plurality of common electrodes; and a data line driving circuit that supplies the pixels, corresponding to the selected scanning line, with data signals of voltages corresponding to gray-scale levels of the pixels through the data lines, wherein when one of odd-numbered scanning lines or a scanning line located a predetermined number of scanning lines away from the one of the odd-numbered scanning lines is selected, the common electrode driving circuit applies one of a low level voltage and a high level voltage to the common electrode corresponding to the one of the odd-numbered scanning lines, and, after the selection of the one of the odd-numbered scanning lines is completed or after the selection of the scanning line located a predetermined number of scanning lines away from the one of the odd-numbered scanning lines is completed, the common electrode driving circuit maintains the common electrode corresponding to the one of the odd-numbered scanning lines at the one of the low level voltage and the high level voltage, and wherein when one of even-numbered scanning lines or a scanning line located a predetermined number of scanning lines away from the one of the even-numbered scanning lines is selected, the common electrode driving circuit applies the other of the low level voltage and the high level voltage to the common electrode corresponding to the one of the even-numbered scanning lines, and, after the selection of the one of the even-numbered scanning lines is completed or after the selection of the scanning line located a predetermined number of scanning lines away from the one of the even-numbered scanning lines is completed, the common electrode driving circuit maintains the common electrode corresponding to the one of the even-numbered scanning lines at the other of the low level voltage and the high level voltage, wherein the common electrode driving circuit includes first to fourth transistors provided in correspondence with each of the common electrodes, wherein a gate electrode of each first transistor of the first transistors is connected to a corresponding one of the scanning lines or a scanning line located a predetermined number of scanning lines away from the corresponding one of the scanning lines and a source electrode of each first transistor is connected to a first power feed line that is supplied with a voltage with which the third transistor enters one of an on state and an off state, wherein a gate electrode of each second transistor of the second transistors is connected to a corresponding one of the scanning lines or a scanning line located a predetermined number of scanning lines away from the corresponding one of the scanning lines and a source electrode of each second transistor is connected to a second power feed line that is supplied with a voltage with which the fourth transistor enters the other of an on state and an off state, wherein a gate electrode of each third transistor of the third transistors is connected to a drain electrode of a corresponding one of the first transistors and a source electrode of each third transistor is connected to a third power feed line that is supplied with one of a low level voltage and a high level voltage, wherein a gate electrode of each fourth transistor of the fourth transistors is connected to a drain electrode of a corresponding one of the second transistors and a source electrode of each fourth transistor is connected to a fourth power feed line that is supplied with the other of a low level voltage and a high level voltage, and wherein a drain electrode of each third transistor and a drain electrode of each fourth transistor are commonly connected to the corresponding common electrode.

9. A driving circuit comprising: a plurality of scanning lines; a plurality of data lines;

a plurality of common electrodes provided in correspondence with the plurality of scanning lines;

pixels arranged at positions corresponding to intersections of the plurality of scanning lines and the plurality of data lines, wherein each of the pixels includes:

a pixel switching element, one end of which is connected to a corresponding one of the data lines, wherein the pixel switching element enters an electrical conductive state when a corresponding one of the scanning lines is selected; and a pixel capacitor, one end of which is connected to an end of the pixel switching element, which is not connected to the data line, and the other end of the pixel capacitor, which is not connected to the pixel switching element, is connected to the common electrode, and wherein each of the pixels emits light with a gray-scale level corresponding to a voltage held by the corresponding pixel capacitor;

a scanning line driving circuit that sequentially selects the scanning lines in a predetermined order;

a common electrode driving circuit that separately drives the plurality of common electrodes; and a data line driving circuit that supplies the pixels, corresponding to the selected scanning line, with data signals of voltages corresponding to gray-scale levels of the pixels through the data lines, wherein when one of odd-numbered scanning lines or a scanning line located a predetermined number of scanning lines away from the one of the odd-numbered scanning lines is selected, the common electrode driving circuit applies one of a low level voltage and a high level voltage to the common electrode corresponding to the one of the odd-numbered scanning lines, and, after the selection of the one of the odd-numbered scanning lines is completed or after the selection of the scanning line located a predetermined number of scanning lines away from the one of the odd-numbered scanning lines is completed, the common electrode driving circuit maintains the common electrode corresponding to the one of the odd-numbered scanning line at the one of the low level voltage and the high level voltage, and wherein when one of even-numbered scanning lines or a scanning line located a predetermined number of scanning lines away from the one of the even-numbered scanning lines is selected, the common electrode driving circuit applies the other of the low level voltage and the high level voltage to the common electrode corresponding to the one of the even-numbered scanning lines, and, after the selection of the one of the even-numbered scanning lines is completed or after the selection of the scanning line located a predetermined number of scanning lines away from the one of the even-numbered scanning lines is completed, the common electrode driving circuit maintains the common electrode corresponding to the one of the even-numbered scanning lines at the other of the low level voltage and the high level voltage, wherein the common electrode driving circuit includes first and third transistors provided in correspondence with each of the odd-numbered common electrodes, and the common electrode driving circuit includes second and fourth transistors provided in correspondence with each of the even-numbered common electrodes, wherein a gate electrode of each first transistor of the first transistors is connected to a corresponding one of the scanning lines or a scanning line located a predetermined number of scanning lines away from the corresponding one of the scanning lines and a source electrode of each first transistor is connected to a first power feed line that is supplied with a voltage with which the third transistor enters one of an on state and an off state, wherein a gate electrode of each second transistor of the second transistors is connected to a corresponding one of the scanning lines or a scanning line located a predetermined number of scanning lines away from the corresponding one of the scanning lines and a source electrode of each second transistor is connected to a second power feed line that is supplied with a voltage with which the fourth transistor enters the other of an on state and an off state, wherein a gate electrode of each third transistor of the third transistors is connected to a drain electrode of the corresponding first transistor and a source electrode of each third transistor is connected to a third power feed line that is supplied with one of a low level voltage and a high level voltage, wherein a gate electrode of each fourth transistor of the fourth transistors is connected to a drain electrode of the corresponding second transistor and a source electrode of each fourth transistor is connected to a fourth power feed line that is supplied with the other of a low level voltage and a high level voltage, and wherein a drain electrode of each third transistor is connected to a corresponding one of the odd-numbered common electrodes and a drain electrode of each fourth transistor is connected to a corresponding one of the even-numbered common electrodes.

10. An electro-optical device, comprising:

a plurality of scanning lines; a plurality of data lines;

a plurality of common electrodes provided in correspondence with the plurality of scanning lines;

pixels arranged at positions corresponding to intersections of the plurality of scanning lines and the plurality of data lines, wherein each of the pixels includes:

a pixel switching element, one end of which is connected to a corresponding one of the data lines, wherein the pixel switching element enters an electrical conductive state when a corresponding one of the scanning lines is selected; and a pixel capacitor, one end of which is connected to an end of the pixel switching element, which is not connected to the data line, and the other end of the pixel capacitor, which is not connected to the pixel switching element, is connected to the common electrode, and wherein each of the pixels emits light with a gray-scale level corresponding to a voltage held by the corresponding pixel capacitor;

a scanning line driving circuit that sequentially selects the scanning lines in a predetermined order;

a common electrode driving circuit that separately drives the plurality of common electrodes; and a data line driving circuit that supplies the pixels, corresponding to the selected scanning line, with data signals of voltages corresponding to gray-scale levels of the pixels through the data lines, wherein when one of odd-numbered scanning lines or a scanning line located a predetermined number of scanning lines away from the one of the odd-numbered scanning lines is selected, the common electrode driving circuit applies one of a low level voltage and a high level voltage to the common electrode corresponding to the one of the odd-numbered scanning lines, and, after the selection of the one of the odd-numbered scanning lines is completed or after the selection of the scanning line located a predetermined number of scanning lines away from the one of the odd-numbered scanning lines is completed, the common electrode driving circuit maintains the common electrode corresponding to the one of the odd-numbered scanning lines at the one of the low level voltage and the high level voltage, and wherein when one of even-numbered scanning lines or a scanning line located a predetermined number of scanning lines away from the one of the even-numbered scanning lines is selected, the common electrode driving circuit applies the other of the low level voltage and the high level voltage to the common electrode corresponding to the one of the even-numbered scanning lines, and, after the selection of the one of the even-numbered scanning lines is completed or after the selection of the scanning line located a predetermined number of scanning lines away from the one of the even-numbered scanning lines is completed, the common electrode driving circuit maintains the common electrode corresponding to the one of the even-numbered scanning lines at the other of the low level voltage and the high level voltage, wherein the common electrode driving circuit includes first and third transistors provided in correspondence with each of the odd-numbered common electrodes, and the common electrode driving circuit includes second and fourth transistors provided in correspondence with each of the even-numbered common electrodes, wherein a gate electrode of each first transistor of the first transistors is connected to a corresponding one of the scanning lines or a scanning line located a predetermined number of scanning lines away from the corresponding one of the scanning lines and a source electrode of each first transistor is connected to a first power feed line that is supplied with a voltage with which the third transistor enters one of an on state and an off state, wherein a gate electrode of each second transistor of the second transistors is connected to a corresponding one of the scanning lines or a scanning line located a predetermined number of scanning lines away from the corresponding one of the scanning lines and a source electrode of each second transistor is connected to a second power feed line that is supplied with a voltage with which the fourth transistor enters the other of an on state and an off state, wherein a gate electrode of each third transistor of the third transistors is connected to a drain electrode of the corresponding first transistor and a source electrode of each third transistor is connected to a third power feed line that is supplied with one of a low level voltage and a high level voltage, wherein a gate electrode of each fourth transistor of the fourth transistors is connected to a drain electrode of the corresponding second transistor and a source electrode of each fourth transistor is connected to a fourth power feed line that is supplied with the other of a low level voltage and a high level voltage, and wherein a drain electrode of each third transistor is connected to a corresponding one of the odd-numbered common electrodes and a drain electrode of each fourth transistor is connected to a corresponding one of the even-numbered common electrodes.

* * * * *